(12) United States Patent
Mikami et al.

(10) Patent No.: US 12,159,995 B2
(45) Date of Patent: Dec. 3, 2024

(54) NEGATIVE ELECTRODE ACTIVE MATERIAL, SECONDARY BATTERY, AND ELECTRONIC DEVICE

(71) Applicant: SEMICONDUCTOR ENERGY LABORATORY CO., LTD., Atsugi (JP)

(72) Inventors: Mayumi Mikami, Kanagawa (JP); Jun Ishikawa, Kanagawa (JP); Miku Fujita, Kanagawa (JP); Kazuhei Narita, Tokyo (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 1032 days.

(21) Appl. No.: 16/982,959

(22) PCT Filed: Mar. 26, 2019

(86) PCT No.: PCT/IB2019/052418
§ 371 (c)(1),
(2) Date: Sep. 21, 2020

(87) PCT Pub. No.: WO2019/193450
PCT Pub. Date: Oct. 10, 2019

(65) Prior Publication Data
US 2021/0020928 A1 Jan. 21, 2021

(30) Foreign Application Priority Data
Apr. 5, 2018 (JP) ................................ 2018-073342

(51) Int. Cl.
*H01M 4/38* (2006.01)
*H01M 4/02* (2006.01)
(Continued)

(52) U.S. Cl.
CPC ........... *H01M 4/386* (2013.01); *H01M 4/131* (2013.01); *H01M 4/133* (2013.01); *H01M 4/134* (2013.01);
(Continued)

(58) Field of Classification Search
CPC ...... H01M 4/386; H01M 4/134; H01M 4/625; H01M 4/131; H01M 4/133; H01M 10/0525
See application file for complete search history.

(56) References Cited

U.S. PATENT DOCUMENTS 9,680,272 B2 6/2017 Ogino
9,761,869 B2 9/2017 Kawakami et al.
(Continued)

FOREIGN PATENT DOCUMENTS

CN 103258991 A 8/2013
EP 2940760 A 11/2015
(Continued)

OTHER PUBLICATIONS

Yue.H et al., "High-yield fabrication of graphene-wrapped silicon nanoparticles for self-support and binder-free anodes of lithium-ion batteries", Journal of Alloys and Compounds, Feb. 8, 2018, vol. 744, pp. 243-251.
(Continued)

*Primary Examiner* — Sarah A. Slifka
(74) *Attorney, Agent, or Firm* — Fish & Richardson P.C.

(57) ABSTRACT

A negative electrode active material with high capacity and excellent cycle performance and rate performance is provided. In addition, a secondary battery including the negative electrode active material, and an electronic device including the secondary battery are provided. Nanosilicon is mixed with a solid electrolyte containing lithium, titanium, phosphorus, and oxygen, and graphene oxide is further
(Continued)

added thereto. Then, graphene oxide contained in the mixture is reduced with ethanol in which ascorbic acid and lithium hydroxide hydrate are dissolved, so that the negative electrode active material is manufactured.

7 Claims, 18 Drawing Sheets

(51) Int. Cl.
  $H01M\ 4/131$ (2010.01)
  $H01M\ 4/133$ (2010.01)
  $H01M\ 4/134$ (2010.01)
  $H01M\ 10/0525$ (2010.01)

(52) U.S. Cl.
  CPC .. *H01M 10/0525* (2013.01); *H01M 2004/027* (2013.01); *H01M 2300/0071* (2013.01)

(56) References Cited

U.S. PATENT DOCUMENTS

| | | |
|---|---|---|
| 9,911,976 B2 | 3/2018 | Kawakami et al. |
| 10,586,978 B2 | 3/2020 | Kawakami et al. |
| 2013/0212879 A1 | 8/2013 | Ogino |
| 2013/0252088 A1 | 9/2013 | Kuriki et al. |
| 2016/0043406 A1 | 2/2016 | Kuriki et al. |
| 2017/0194663 A1 | 7/2017 | Zhamu et al. |
| 2017/0279239 A1 | 9/2017 | Ogino |
| 2018/0019462 A1 | 1/2018 | Kadoma et al. |
| 2018/0248169 A1 | 8/2018 | Ogino |

FOREIGN PATENT DOCUMENTS

| | | |
|---|---|---|
| JP | 2006-164758 A | 6/2006 |
| JP | 2013-191552 A | 9/2013 |
| JP | 2014-192093 A | 10/2014 |
| JP | 2015-181136 A | 10/2015 |
| JP | 2016-509739 | 3/2016 |
| JP | 2016-149238 A | 8/2016 |
| JP | 2018-026326 A | 2/2018 |
| KR | 2013-0095220 A | 8/2013 |

OTHER PUBLICATIONS

"Next-generation lithium secondary battery", Series of functional chemistry of electrons and ions, May 26, 2003, vol. 3, p. 312, NTS Inc.

International Search Report (Application No. PCT/IB2019/052418) Dated Jul. 23, 2019.

Written Opinion (Application No. PCT/IB2019/052418) Dated Jul. 23, 2019.

Chen.Z et al., "Staging Phase Transitions in LixCoO2", J. Electrochem. Soc. (Journal of the Electrochemical Society), 2002, vol. 149, No. 12, pp. A1604-A1609.

Shim.J et al., "Characterization of Spinel LixCo2O4-Coated LiCoO2 Prepared with Post-Thermal Treatment as a Cathode Material for Lithium Ion Batteries", Chem. Mater. (Chemistry of Materials), Apr. 10, 2015, vol. 27, No. 9, pp. 3273-3279.

Motohashi.T et al., "Electronic phase diagram of the layered cobalt oxide system LixCoO2 (0.0≤x≤1.0)", Phys. Rev. B (Physical Review. B), Oct. 9, 2009, vol. 80, No. 16, pp. 165114-1-155114-9.

Okumura.T et al., "Correlation of lithium ion distribution and X-ray absorption near-edge structure in O3- and O2-lithium cobalt oxides from first-principle calculation", Journal of Materials Chemistry, 2012, vol. 22, pp. 17340-17348.

100

100

102

102

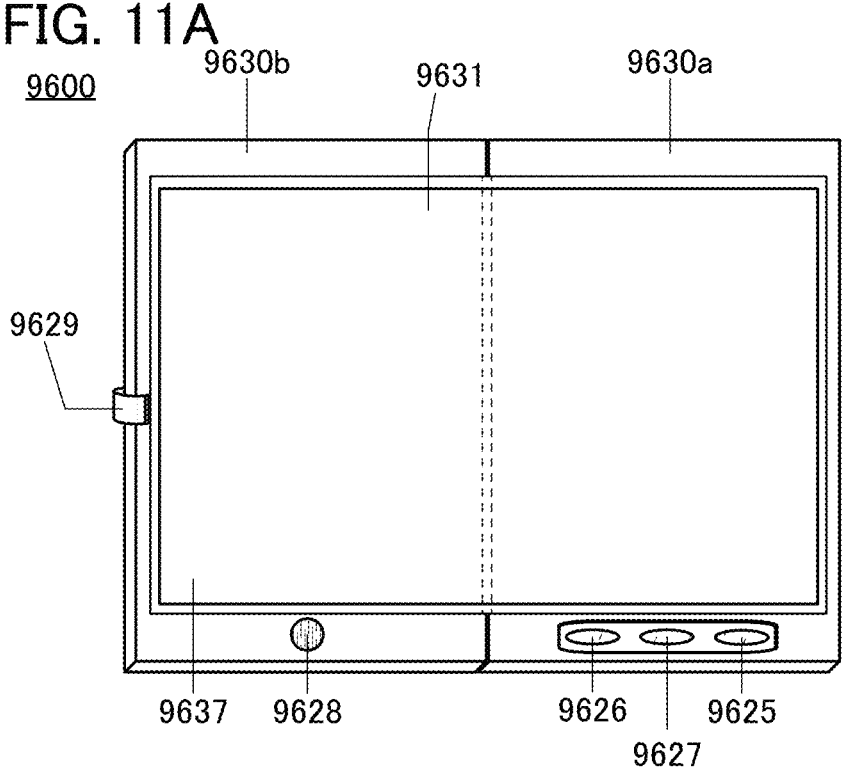
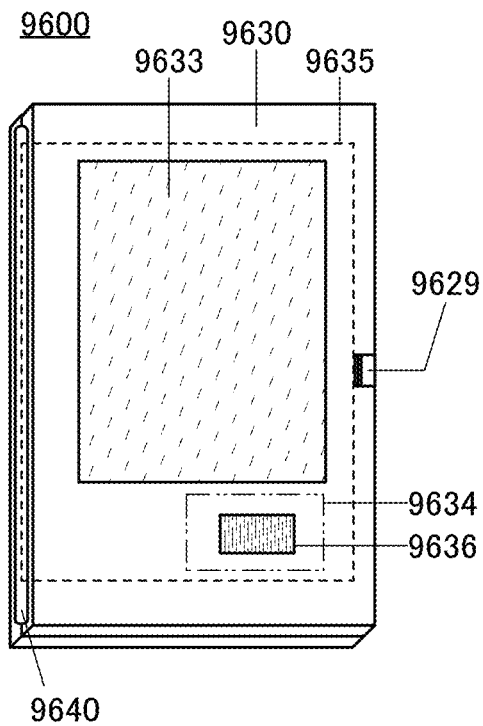
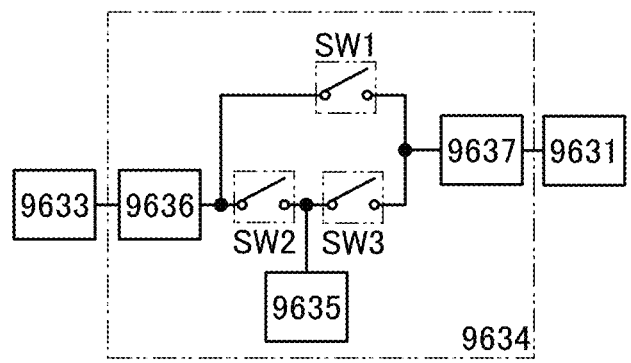

NEGATIVE ELECTRODE ACTIVE MATERIAL, SECONDARY BATTERY, AND ELECTRONIC DEVICE

CROSS REFERENCE TO RELATED APPLICATIONS

This application is a U.S. National Phase Application under 35 U.S.C. § 371 of International Application PCT/IB2019/052418, filed on Mar. 26, 2019, which is incorporated by reference and claims the benefit of a foreign priority application filed in Japan on Apr. 5, 2018, as Application No. 2018-073342.

TECHNICAL FIELD

One embodiment of the present invention relates to a negative electrode active material, a secondary battery, and an electronic device.

Note that one embodiment of the present invention is not limited to the above technical field. The technical field of the invention disclosed in this specification and the like relates to an object, a method, or a manufacturing method. One embodiment of the present invention relates to a process, a machine, manufacture, or a composition of matter. Therefore, specific examples of the technical field of one embodiment of the present invention disclosed in this specification include a semiconductor device, a display device, a liquid crystal display device, a light-emitting device, a power storage device, an imaging device, a memory device, a processor, an electronic device, a system, a driving method thereof, a manufacturing method thereof, and a testing method thereof.

BACKGROUND ART

In recent years, a variety of power storage devices such as lithium-ion secondary batteries, lithium-ion capacitors, and air batteries have been actively developed. In particular, demand for lithium-ion secondary batteries with high output and high energy density has rapidly grown with the development of the semiconductor industry, for mobile phones such as smartphones; portable information terminals such as laptop computers; portable music players; digital cameras; medical equipment; next-generation clean energy vehicles such as hybrid electric vehicles (HEV), electric vehicles (EV), and plug-in hybrid electric vehicles (PHEV); and the like. The lithium-ion secondary batteries are essential to rechargeable energy supply sources in modern society.

The performance required for lithium-ion secondary batteries includes increased energy density, improved cycle performance, safe operation under a variety of environments, and longer-term reliability.

Thus, improvement of a positive electrode active material has been studied to increase the cycle performance and the capacity of the lithium-ion secondary battery (Patent Document 1 and Non-Patent Document 1). A crystal structure of a positive electrode active material also has been studied (Non-Patent Document 2 to Non-Patent Document 4).

REFERENCES

Patent Document

[Patent Document 1] Japanese Published Patent Application No. 2006-164758

Non-Patent Documents

[Non-Patent Document 1] Jae-Hyun Shim et al., "Characterization of Spinel $L_xCo_2O_4$-Coated $LiCoO_2$ Prepared with Post-Thermal Treatment as a Cathode Material for Lithium Ion Batteries", CHEMISTRY OF MATERIALS, 27, 2015, pp. 3273-3279.

[Non-Patent Document 2] Toyoki Okumura et al., "Correlation of lithium ion distribution and X-ray absorption near-edge structure in O3- and O2-lithium cobalt oxides from first-principle calculation", Journal of Materials Chemistry, 22, 2012, pp. 17340-17348.

[Non-Patent Document 3] T. Motohashi et al., "Electronic phase diagram of the layered cobalt oxide system $Li_xCoO_2$ (0.0≤x≤1.0)", Physical Review B, 80 (16); 165114.

[Non-Patent Document 4] Zhaohui Chen et al., "Staging Phase Transitions in $Li_xCoO_2$", Journal of The Electrochemical Society, 149 (12), 2002, A1604-A1609.

SUMMARY OF THE INVENTION

Problems to be Solved by the Invention

In order to increase the discharge capacity of a lithium-ion secondary battery, a material with a high theoretical capacity is preferably used for an electrode of the secondary battery. In particular, silicon (Si) can be used as a negative electrode material, for example. The theoretical capacity of silicon in lithium ions is $3.6 \times 10^3$ mA/g, which is higher than the theoretical capacity ($3.7 \times 10^2$ mA/g) of graphite (C) typically used as an electrode material.

However, the material that is alloyed with lithium (e.g., silicon) greatly expands and contracts with reception and release of carrier ions in charge and discharge cycles; therefore, when the amount of carrier ions received by the material increases, the contact area between an active material and a conductive additive, the contact area between active materials, and the contact area between an active material and a current collector are reduced and a conduction path is lost in some cases. The loss of the conduction path decreases the discharge capacity as charge and discharge cycles increase. Moreover, in some cases, silicon is deformed or broken to be separated from a current collector or pulverized; as a result, a function as a lithium-ion secondary battery becomes difficult to maintain.

An object of one embodiment of the present invention is to provide a negative electrode active material that is unlikely to be damaged even when charge and discharge cycles are repeated. Another object of one embodiment of the present invention is to provide a negative electrode active material that is used in a lithium-ion secondary battery and that inhibits a reduction in capacity in charge and discharge cycles. Another object of one embodiment of the present invention is to provide a high-capacity secondary battery. Another object of one embodiment of the present invention is to provide a secondary battery with excellent charge and discharge characteristics. Another object of one embodiment of the present invention is to provide a highly safe and/or highly reliable secondary battery.

Another object of one embodiment of the present invention is to provide a manufacturing method of a novel negative electrode active material.

Note that the objects of embodiments of the present invention are not limited to the objects listed above. The objects listed above do not disturb the existence of other objects. The other objects are objects that are not described in this section and will be described below. The objects that are not described in this section will be derived from the descriptions of the specification, the drawings, and the like and can be extracted from these descriptions by those skilled in the art. Note that one embodiment of the present invention is to solve at least one of the objects listed above and the other objects. Note that one embodiment of the present invention does not necessarily solve all the objects listed above and the other objects.

Means for Solving the Problems (1) One embodiment of the present invention is a negative electrode active material including a particle, a solid electrolyte, and a graphene compound; in the negative electrode active material, the particle contains silicon, and the solid electrolyte contains lithium, titanium, phosphorus, and oxygen.

(2) Another embodiment of the present invention is the negative electrode active material with the above structure (1), in which the solid electrolyte contains aluminum.

(3) Another embodiment of the present invention is the negative electrode active material with the above structure (1) or (2), in which a primary particle of the particle has a size greater than or equal to 10 nm and less than or equal to 100 nm.

(4) Another embodiment of the present invention is the negative electrode active material with any one of the above structures (1) to (3), in which the graphene compound contains graphene oxide.

(5) Another embodiment of the present invention is the negative electrode active material with any one of the above structures (1) to (4), in which the graphene compound contains reduced graphene oxide.

(6) One embodiment of the present invention is a secondary battery including any one of the negative electrode active materials (1) to (5).

(7) One embodiment of the present invention is an electronic device including the above secondary battery (6).

Effect of the Invention

According to one embodiment of the present invention, a negative electrode active material that is unlikely to be damaged even when charge and discharge cycles are repeated can be provided. According to another embodiment of the present invention, a negative electrode active material that is used in a lithium-ion secondary battery and that inhibits a reduction in capacity in charge and discharge cycles can be provided. According to another embodiment of the present invention, a high-capacity secondary battery can be provided. According to another embodiment of the present invention, a secondary battery with excellent charge and discharge characteristics can be provided. According to another embodiment of the present invention, a highly safe and/or highly reliable secondary battery can be provided.

According to another embodiment of the present invention, a manufacturing method of a novel negative electrode active material can be provided.

Note that the effects of embodiments of the present invention are not limited to the effects listed above. The effects listed above do not disturb the existence of other effects. The other effects are effects that are not described in this section and will be described below. The other effects that are not described in this section will be derived from the descriptions of the specification, the drawings, and the like and can be extracted from these descriptions by those skilled in the art. Note that one embodiment of the present invention has at least one of the effects listed above and the other effects. Accordingly, depending on the case, one embodiment of the present invention does not have the effects listed above in some cases.

BRIEF DESCRIPTION OF THE DRAWINGS

FIGS. 11A to 11C Diagrams illustrating an example of an electronic device.

MODE FOR CARRYING OUT THE INVENTION

Hereinafter, embodiments of the present invention will be described in detail with reference to the drawings. Note that the present invention is not limited to the description below, and it is easily understood by those skilled in the art that modes and details of the present invention can be modified in various ways. In addition, the present invention should not be construed as being limited to the description in the following embodiments.

In this specification and the like, the theoretical capacity of a positive electrode active material refers to the amount of electricity when all lithium that can be inserted and extracted are extracted from the positive electrode active material. For example, the theoretical capacity of $LiCoO_2$ is 274 mAh/g, the theoretical capacity of $LiNiO_2$ is 274 mAh/g, and the theoretical capacity of $LiMn_2O_4$ is 148 mAh/g.

In this specification and the like, the theoretical capacity of a negative electrode active material refers to the amount of electricity when all lithium that can be inserted and extracted are inserted into the negative electrode active material. For example, the theoretical capacity of Si is 4200 mAh/g and the theoretical capacity of graphite is 372 mAh/g.

In this specification and the like, the charge depth at the time when all lithium that can be inserted and extracted are inserted into a positive electrode active material is 0, and the charge depth at the time when all lithium that can be inserted and extracted are extracted from a positive electrode active material is 1.

In this specification and the like, the charge depth at the time when all lithium that can be inserted and extracted are inserted into a negative electrode active material is 1, and the charge depth at the time when all lithium that can be inserted and extracted are extracted from a negative electrode active material is 0.

In this specification and the like, charging refers to transfer of lithium ions from a positive electrode to a negative electrode in a battery. Charging of a positive electrode active material refers to extraction of lithium ions, and charging of a negative electrode active material refers to insertion of lithium ions.

Similarly, discharging refers to transfer of lithium ions from a negative electrode to a positive electrode in a battery. Discharging of a positive electrode active material refers to insertion of lithium ions, and discharging of a negative electrode active material refers to extraction of lithium ions.

Embodiment 1

Described in this embodiment are a negative electrode that can be used for a secondary battery, a negative electrode active material layer of the negative electrode, and a negative electrode active material included in the negative electrode active material layer, which are embodiments of the present invention.

Figure 1A:
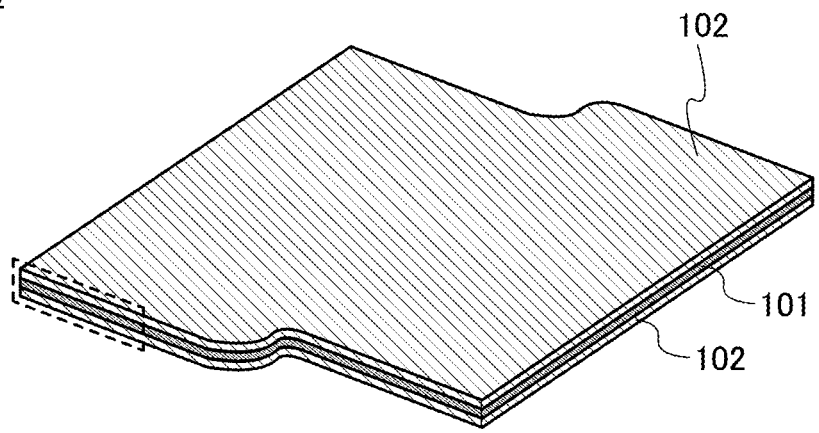
FIGS. 1A to 1D Schematic diagrams illustrating a negative electrode and a negative electrode active material.
Figure 1B:
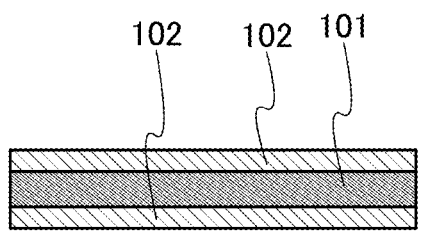

FIG. 1(A) is an overhead view of a negative electrode, and FIG. 1(B) is an enlarged view of a cross section surrounded by a dashed line in FIG. 1(A). A negative electrode 100 has a structure in which a negative electrode active material layer 102 is provided in contact with a negative electrode current collector 101. Although the negative electrode active material layers 102 are provided on both surfaces of the negative electrode current collector 101 in FIGS. 1(A) and 1(B), the negative electrode active material layer 102 may be provided on only one surface of the negative electrode current collector 101.

Figure 1C:
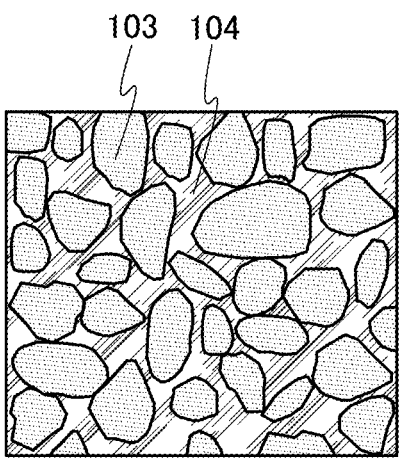

FIG. 1(C) is a cross-sectional view of the negative electrode active material layer 102 including a particle 103 and a solid electrolyte 104. The particle 103 is surrounded by the solid electrolyte 104. The negative electrode active material layer 102 may also include a conductive additive and/or a binder.

The particle 103 and the solid electrolyte 104 function as active materials. The active material refers to a material involved in insertion and extraction of ions, which are carriers. In fabricating a negative electrode described later, the particle 103 and the solid electrolyte 104 are mixed with another material such as a solvent and formed as an active material layer over a current collector. Hence, the active material and the active material layer are distinguished from each other.

The negative electrode current collector 101 can be formed using a material that has high conductivity and is not alloyed with carrier ions such as lithium ions, e.g., a metal such as gold, platinum, zinc, iron, copper, titanium, tantalum, or manganese, and an alloy thereof (e.g., stainless steel). Alternatively, the negative electrode current collector 101 may be formed using a metal element that forms a silicide by reacting with silicon. Examples of the metal element that forms a silicide by reacting with silicon include zirconium, titanium, hafnium, vanadium, niobium, tantalum, chromium, molybdenum, tungsten, cobalt, and nickel. The negative electrode current collector 101 can have a shape such as a foil-like shape, a plate-like (sheet-like) shape, a net-like shape, a cylindrical shape, a coil shape, a punching-metal shape, or an expanded-metal shape as appropriate. The negative electrode current collector 101 may have, for example, a thickness greater than or equal to 5 μm and less than or equal to 30 μm, preferably greater than or equal to 8 μm and less than or equal to 15 μm. As an example, the thickness of the negative electrode current collector 101 is preferably greater than or equal to 5 μm and less than or equal to 30 μm, further preferably greater than or equal to 8 μm and less than or equal to 15 μm over the whole region. However, one embodiment of the present invention is not limited thereto. For example, at least part of the negative electrode current collector 101 may have a thickness greater than or equal to 5 μm and less than or equal to 30 μm, preferably greater than or equal to 8 μm and less than or equal to 15 μm. Alternatively, a region of 50% or more of the negative electrode current collector 101 may have a thickness greater than or equal to 5 μm and less than or equal to 30 μm, preferably greater than or equal to 8 μm and less than or equal to 15 μm.

Figure 1D:
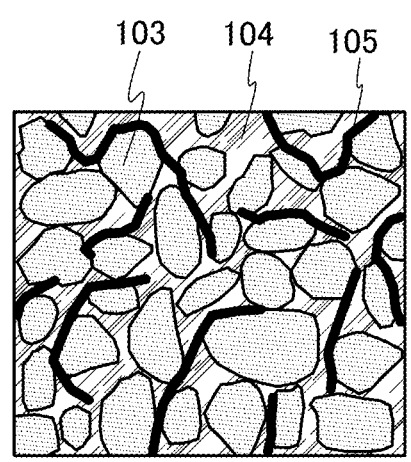

The negative electrode active material layer 102 described in this embodiment is a material including silicon as the particle 103 and lithium titanium phosphate (hereinafter referred to as LTPO) or lithium titanium aluminum phosphate (hereinafter referred to as LTAP) as the solid electrolyte 104. Furthermore, as shown in FIG. 1(D), the negative electrode active material layer 102 may include a material 105 that contains at least one of graphene, graphene oxide (GO), multilayer graphene, RGO (a compound obtained by reducing GO), and the like. Note that in this specification and the like, LTPO and LATP are collectively referred to as lithium-conductive ceramic, and GO, multilayer graphene, and RGO are collectively referred to as a graphene compound.

A primary particle of silicon preferably has a size greater than or equal to approximately 10 nm and less than or equal to approximately 100 nm. This is because silicon with a size greater than 100 nm is sometimes damaged due to expansion and contraction during charging and discharging. A secondary particle of silicon preferably has a size greater than or equal to approximately 8 μm and less than or equal to approximately 12 μm.

Note that in this specification and the like, the primary particle refers to a particle that is not aggregated with another particle. In other words, the primary particle is an aggregate of atoms continuously connected by the bond between atoms. Hence, the primary particle becomes single crystal, polycrystal, amorphous, or the like in some cases. The contour of the primary particle can be clearly observed in some cases with use of a scanning electron microscope (SEM) or the like.

Also in this specification and the like, the secondary particle refers to a particle in which primary particles are aggregated by intermolecular force or the like. In addition, primary particles sintered so that the shapes of individual primary particles can be observed are sometimes referred to as a secondary particle. Thus, the secondary particle in which primary particles are aggregated has a void in some cases. When the secondary particle is observed with use of a scanning electron microscope or the like, the aggregation and/or the void of the primary particles can be found in some cases. The secondary particle may be composed of two or more kinds of primary particles with different solid substances.

A secondary particle composed of lithium-conductive ceramic and silicon preferably has a size greater than or equal to approximately 8 µm and less than or equal to approximately 12 µm. This is because lithium-conductive ceramic with a size less than 8 µm causes aggregation of particles in some cases, so that the particles are not dispersed. In particular, when lithium-conductive ceramic particles are aggregated in a negative electrode active material layer including lithium-conductive ceramic and silicon, deterioration of silicon due to repeated charging and discharging cannot be prevented. In addition, the particles which are not dispersed cannot be properly applied on the negative electrode current collector 101, and the thus formed negative electrode might cause malfunction such as a short circuit during charging and discharging.

Figure 2:
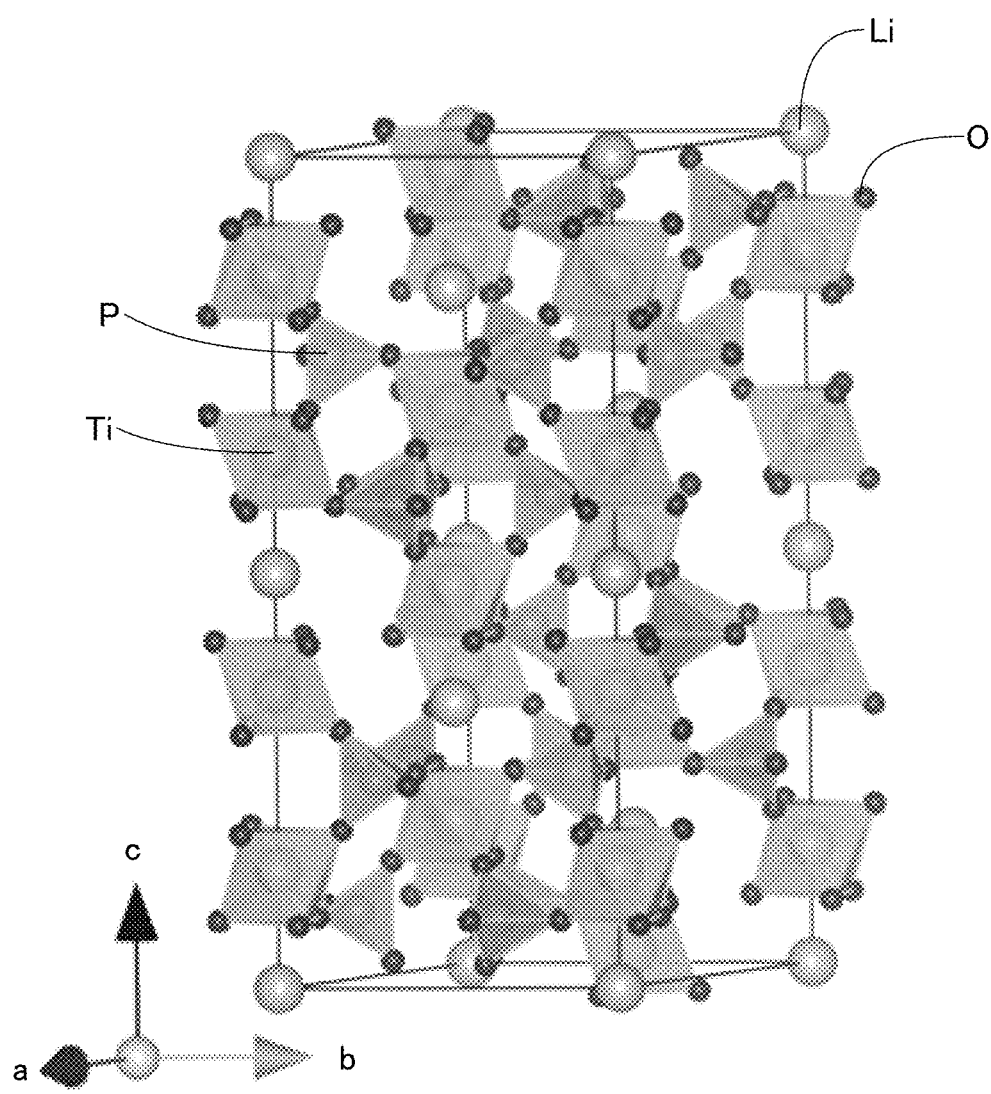
FIG. 2 A diagram illustrating a crystal structure of LTPO.

FIG. 2 shows a crystal structure of LTPO. LTPO is a NASICON compound having a structure of the space group R-3cH. As shown in FIG. 2, LTPO has an octahedral structure in which six oxygen (O) atoms are coordinated to titanium (Ti) and a tetrahedral structure in which four oxygen atoms are coordinated to phosphorus (P). Oxygen atoms coordinated to titanium and phosphorus are shared to form the octahedral structure and the tetrahedral structure.

In contrast, LATP (not shown) can be obtained by substitution of aluminum for part of a titanium site shown in FIG. 2. The substitution of aluminum for part of a titanium site in LTPO offers LATP and increases electric conductivity.

<Example of Method for Manufacturing LTPO>

Figure 3A:
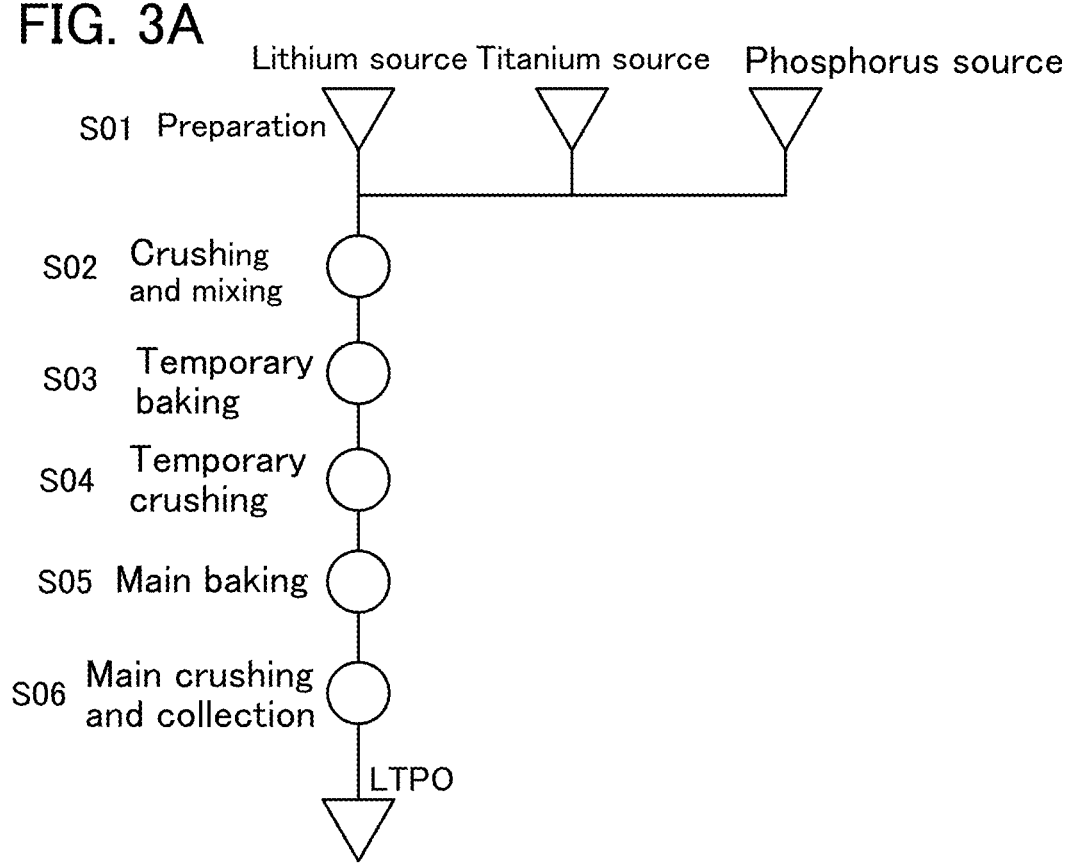
FIGS. 3A and 3B Diagrams illustrating examples of a method for manufacturing a solid electrolyte.

Described here is an example of a method for manufacturing LTPO contained in the negative electrode active material of one embodiment of the present invention. Note that the steps of the method for manufacturing LTPO are schematically shown in FIG. 3(A).

[Step S01: Preparation of Raw Materials]

First, a lithium source, a titanium source, and a phosphorus source are prepared as starting raw materials for manufacturing LTPO. As the lithium source, for example, lithium carbonate ($Li_2CO_3$) is preferably used. As the titanium source, titanium oxide ($TiO_2$) is preferably used. As the phosphorus source, ammonium hydrogenphosphate ($NH_4H_2PO_4$) is preferably used. The description in this embodiment is made on the assumption that lithium carbonate, titanium oxide, and ammonium hydrogenphosphate are prepared so as to satisfy the stoichiometric composition.

[Step S02: Mixing of Starting Raw Materials]

Next, the prepared raw materials are mixed. The mixing can be performed with a mill, for example. The use of the mill allows the materials to be crushed and mixed at a time. In the case where a ball mill or a bead mill is used as the mill, a mixture with a desired grain size can be obtained in some cases by adjusting the material of a medium, the size of a medium, the mass of a medium, the rotation number of a container where the raw materials are put, the treatment time, and the like. A zirconia ball is preferably used as the medium, for example. After the mixing, the mixture and the medium are separated with a desired sieve.

Note that in the case where the mixing is performed with a mill by a wet method, in some cases, the prepared raw materials are preferably mixed with an organic solvent such as ethanol or acetone, or a liquid such as water to obtain a slurry (note that FIG. 3(A) does not show an organic solvent and a liquid such as water, which are used in the wet method). In that case, the mixture is preferably obtained in such a manner that the medium included in the slurry is removed with a sieve with a desired aperture after the mixing, and the liquid is evaporated from the slurry not including the medium with a hot plate for experiment. Alternatively, after the liquid is evaporated first, the slurry and the medium may be separated with a sieve with a desired aperture to obtain the mixture.

Note that in this specification, the mill refers to a ball mill, a bead mill, a jet mill, or the like in some cases. The mill described in this specification is not limited to a type of mill and may be a given mill. For example, in the case where grinding treatment is performed in two different steps, different mills may be used for the grinding treatment in the respective steps. In the case where grinding treatment is performed several times in a step, each grinding treatment may be performed with a different mill.

[Step S03: Temporary Baking]

Next, the materials mixed in Step S02 are heated. This step is referred to as temporary baking or first heating in some cases. Note that the temporary baking is preferably performed at higher than or equal to 200° C. and lower than or equal to 600° C. and the time for the temporary baking is preferably longer than or equal to 2 hours and shorter than or equal to 20 hours. Furthermore, the temporary baking is preferably performed in a nitrogen atmosphere and/or a dry atmosphere.

[Step S04: Temporary Crushing]

The baked product obtained in Step S03 is crushed in a mortar. This step is sometimes referred to as temporary crushing or first crushing. The crushed baked product may be further crushed into finer products with a mill. In the case where a ball mill or a bead mill is used as the mill, a zirconia ball is preferably used as the medium, for example. For the crushing using the mill, the description in Step S02 is referred to. Note that in the case where the crushing is performed by a wet method, an organic solvent such as ethanol or acetone is preferably added to the baked product before the crushing.

[Step S05: Main Baking]

In this step, the material crushed in Step S04 is heated. This step is sometimes referred to as main baking or second heating. Note that the main baking is preferably performed at higher than or equal to 800° C. and lower than or equal to 1100° C. and the time for the main baking is preferably longer than or equal to 2 hours and shorter than or equal to 20 hours. Furthermore, the main baking is preferably performed in a nitrogen atmosphere and/or a dry atmosphere.

[Step S06: Main Crushing and Collection]

Lastly, the baked product obtained in Step S05 is crushed in a mortar. This step is sometimes referred to as main crushing or second crushing. The crushed baked product may be further crushed into finer products with a mill. In the case where a ball mill or a bead mill is used as the mill, a zirconia ball is preferably used as a medium, for example. For the crushing using the ball mill or the bead mill, the description in Step S02 is referred to. Note that in the case where the crushing is performed by a wet method, an organic solvent such as ethanol or acetone is preferably added to the baked product before the crushing. The product obtained by crushing in this step is LTPO.

LTPO can be manufactured in the above manufacturing example.

<Example of Method for Manufacturing LATP>

Figure 3B:
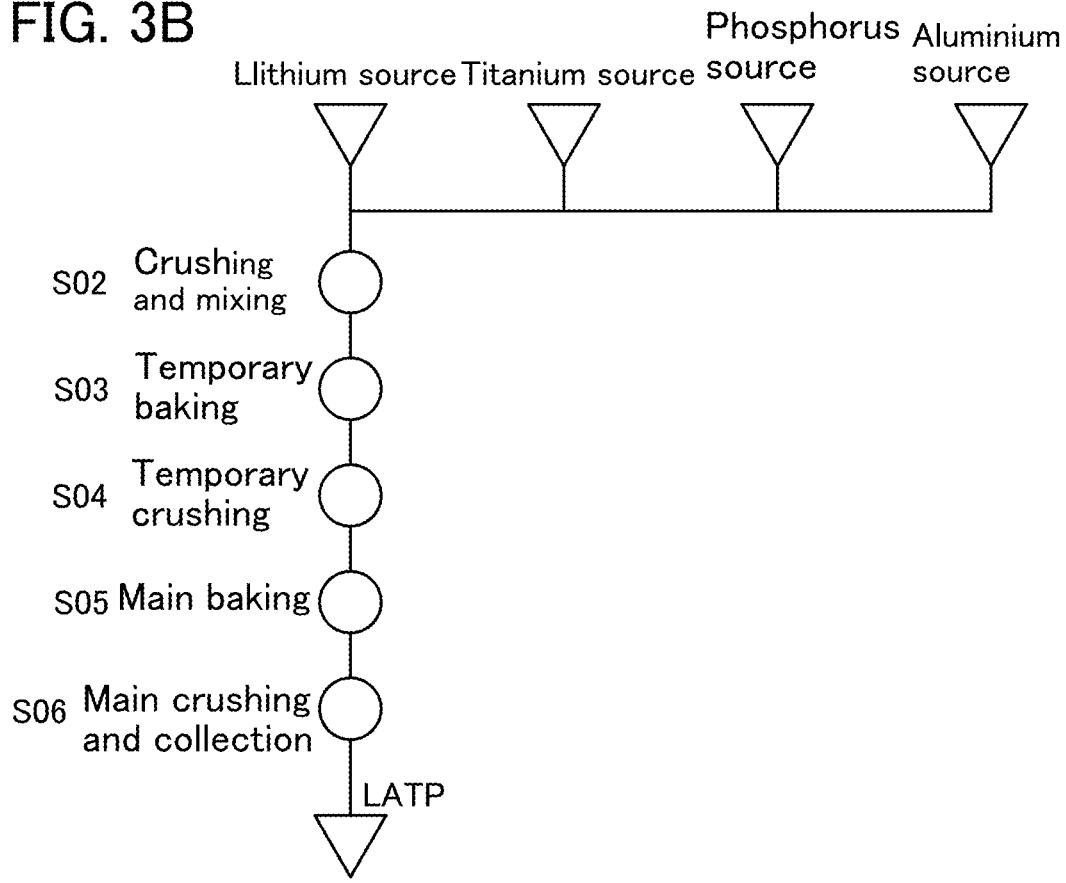

Described next is an example of a method for manufacturing LATP contained in the negative electrode active material of one embodiment of the present invention. Note that the steps of the method for manufacturing LATP are schematically shown in FIG. 3(B).

As starting raw materials for manufacturing LATP contained in the negative electrode active material of one embodiment of the present invention, a lithium source, a titanium source, a phosphorus source, and an aluminum source are prepared. Note that for the lithium source, the titanium source, and the phosphorus source, the above description of the preparation of the raw materials for LTPO in Step S01 is referred to. As the aluminum source, for example, aluminum oxide ($Al_2O_3$) is preferably used, and the description in this embodiment is made on the assumption that aluminum oxide is prepared so as to satisfy the stoichiometric composition. After the materials for manufacturing LATP are prepared, steps similar to Step S02 to Step S06 in the aforementioned manufacturing method of LTPO are performed, so that LATP can be manufactured.

<Example of Mixing with Silicon>

Figure 4:
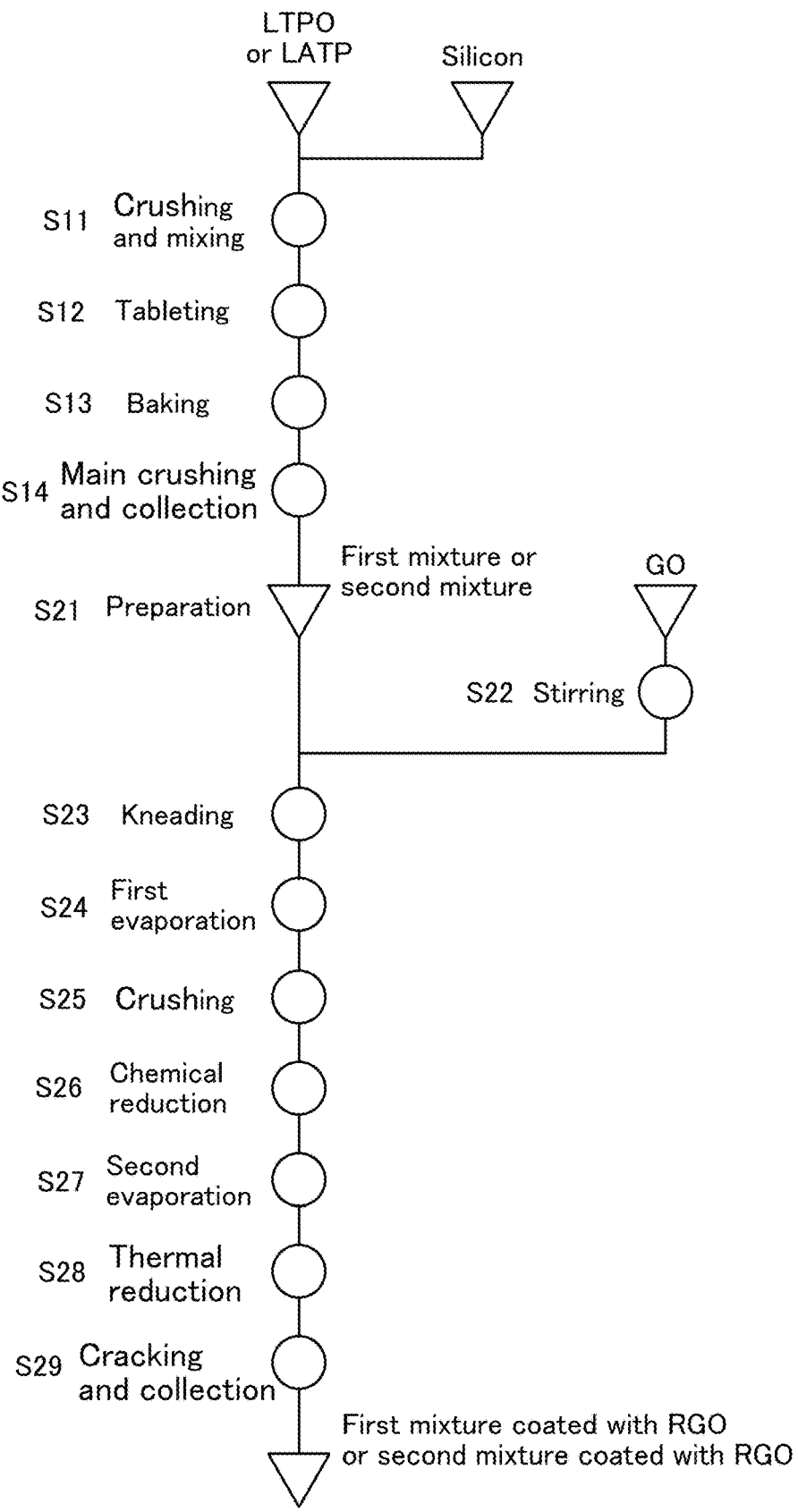
FIG. 4 A diagram illustrating an example of a method for manufacturing a negative electrode active material.

Here, an example of mixing one of LTPO and LATP with silicon is described. Note that the step of mixing one of LTPO and LATP with silicon corresponds to Step S11 to Step S14 in FIG. 4.

[Step S11: Crushing and Mixing]

One of LTPO and LATP, which are obtained in the above manufacturing method example, is mixed with silicon. Silicon is preferably, for example, nanoparticle silicon (nanoparticle silicon is sometimes referred to as nanosilicon). The mixing can be performed with a mill, for example. In the case where a ball mill or a bead mill is used as the mill, a zirconia ball is preferably used as a medium, for example. At the same time as the mixing, LTPO or LATP and silicon can be crushed. The crushing preferably makes the size of a silicon particle approximately equal to the size of a LTPO or LATPO particle. For the crushing using the ball mill or the bead mill, the description in Step S02 is referred to. Note that in the case where a wet method is used, the crushing and mixing are preferably performed with a slurry in which acetone is added to a mixture of one of LTPO and LATP and silicon. After the slurry is crushed and mixed by a wet method, the medium is removed from the slurry with a sieve with a desired aperture, and acetone is removed with a hot plate for experiment or the like, so that the mixture of one of LTPO and LATP and silicon can be obtained.

[Step S12: Tableting]

In order to promote sintering of one of LTPO and LATP and silicon in the mixture obtained in Step S11, the mixture is molded with a tableting machine or the like.

[Step S13: Baking]

In this step, the molded product obtained in Step S12 is heated. Note that the baking is preferably performed at higher than or equal to 400° C. and lower than or equal to 1100° C. and the time for the baking is preferably longer than or equal to 2 hours and shorter than or equal to 20 hours. Furthermore, the baking is preferably performed in a nitrogen atmosphere and/or a dry atmosphere.

[Step S14: Crushing and Collection]

Lastly, the baked product obtained in Step S13 is crushed in a mortar. After the crushing, the baked product is preferably made to pass through a sieve in order that only a baked product with a predetermined size can be collected.

Through Step S11 to Step S14 described above, the mixture of one of LTPO and LATP and silicon can be manufactured. Note that in this specification and the like, a mixture of LTPO and silicon is referred to as a first mixture and a mixture of LATP and silicon is referred to as a second mixture.

<Example of Coating Method of RGO>

A graphene compound may be further added to the first mixture or the second mixture. As the graphene compound, for example, GO, multilayer graphene, or RGO can be used. Described here is an example of a method for further coating the first mixture or the second mixture with RGO. Note that this method example corresponds to Step S21 to Step S29 in FIG. 4.

[Step S21: Preparation of Raw Materials]

GO and one of the first mixture and the second mixture obtained in the above manufacturing method example are prepared in appropriate amounts.

[Step S22: Stirring]

Water is added to GO prepared in Step S21 and stirring is performed with a mixer. Note that the addition of water and the stirring are preferably repeated several times.

[Step S23: Kneading]

Next, GO stirred in Step S22 is added to one of the first mixture and the second mixture prepared in Step S21 and kneading is performed with a mixer.

[Step S24: First Evaporation]

In this step, the kneaded mixture is subjected to heat treatment or the like, so that moisture is removed from the mixture. Note that this step is referred to as first evaporation in some cases.

[Step S25: Crushing]

The mixture obtained in Step S24 is crushed in a mortar. After the crushing, the mixture is preferably made to pass through a sieve in order that only a mixture with a predetermined size can be collected.

[Step S26: Chemical Reduction]

Next, GO included in the crushed mixture is reduced with a reducing agent to be RGO. As the reducing agent, for example, ascorbic acid can be used. Note that after the reduction, cleaning and filtration are preferably performed with water, an organic solvent such as ethanol or acetone, or the like, thereby removing the reducing agent from the mixture.

In order to accelerate the reduction reaction, thermal reduction may be performed in addition to the chemical reduction with ascorbic acid. Note that the thermal reduction is described later in Step S28.

[Step S27: Second Evaporation]

In this step, the mixture reduced in Step S26 is subjected to heat treatment, so that water and/or the organic solvent are/is removed from the mixture. The temperature of the heat treatment may be determined as appropriate depending on water and/or the organic solvent included in the mixture. Note that this step is referred to as second evaporation in some cases.

[Step S28: Thermal Reduction]

In the case where the reduction reaction of GO included in the crushed mixture is to be accelerated, thermal reduction may be performed in this step in addition to the chemical reduction in Step S26. In the case where thermal reduction of GO is performed, the mixture obtained in Step 27 is preferably heated in vacuum at higher than or equal to 200° C. and lower than or equal to 300° C. for longer than or equal to 8 hours and shorter than or equal to 12 hours. Note that the above second evaporation in Step S27 can also serve as the thermal reduction. Note that in this step, GO included in the mixture may all be reduced, or part of GO may be reduced while the rest is not reduced.

[Step S29: Crushing and Collection]

The mixture obtained in Step S28 is crushed in a mortar. After the crushing, the mixture is preferably made to pass through a sieve in order that only a mixture with a predetermined size can be collected.

Through Step S21 to Step S29 described above, the first mixture coated with RGO or the second mixture coated with RGO can be obtained.

<Example of Method for Manufacturing Negative Electrode>

Described next is an example of a method for manufacturing the negative electrode 100 including, in the negative electrode active material layer 102, the mixture of one of LTPO and LATP and silicon or the mixture coated with RGO, which can be manufactured by the above method.

First, a solvent and/or a binder are/is added to the mixture manufactured by the above method and mixed. The mixing ratio of them can be adjusted as appropriate in accordance with desired battery properties.

As the solvent, a liquid in which the raw materials are not dissolved and the raw materials are dispersed in the solvent can be used. The solvent is preferably a polar solvent; for example, any one of water, methanol, ethanol, acetone, tetrahydrofuran (THF), dimethylformamide (DMF), N-methyl-2-pyrrolidone (NMP), and dimethyl sulfoxide (DMSO), or a mixed solution of two or more of them can be used.

As the binder, a high heat-resistant binder, e.g., polyimide is used. Note that a substance mixed in this mixing step is a precursor of polyimide, and the precursor is imidized in a subsequent heating step to be polyimide.

In addition to the solvent and the binder, a conductive additive may be further added in order to improve the characteristics of an electron conduction path in the negative electrode active material layer 102. Examples of the conductive additive include acetylene black particles and carbon particles such as carbon nanofibers.

To mix the above compounds, a mixer is used, for example. An example of the mixer is a planetary mixer. The binder, the mixture, and the solvent are mixed and stirred with a mixer, so that a slurry (a mixture) can be manufactured.

Next, the slurry (the mixture) manufactured by the above method is applied by a blade method or the like, whereby the negative electrode active material layer 102 is formed. After that, the negative electrode current collector 101 including the negative electrode active material layer 102 is subjected to evaporation treatment or the like in a dry air environment and/or a reduced pressure environment, so that moisture or the organic solvent is evaporated from the negative electrode active material layer 102. For example, the evaporation treatment is performed in such a manner that the negative electrode current collector 101 is left at room temperature or 50° C. in a dry air environment and/or a reduced pressure environment for approximately one hour. Note that the evaporation treatment is not necessarily performed in the case where water or the organic solvent can be removed in a subsequent heating step.

Then, the negative electrode current collector 101 including the negative electrode active material layer 102 is heated. The heating temperature is higher than or equal to 200° C. and lower than or equal to 500° C., preferably higher than or equal to 300° C. and lower than or equal to 400° C., and the heating time is longer than or equal to 3 hours and shorter than or equal to 7 hours, preferably approximately 5 hours.

Through the above manufacturing steps, the negative electrode 100 in which the negative electrode active material layer 102 is provided over the negative electrode current collector 101 can be manufactured.

Note that the method for manufacturing the negative electrode active material of one embodiment of the present invention is not limited to the above-described method. In this specification and the like, the steps in the manufacturing method are classified into the mixing treatment of the materials, the separation treatment of the materials, the chemical reaction treatment, and the like and are shown as independent steps. However, in actual treatment and the like, it is sometimes difficult to classify and separate the treatment steps shown in the above manufacturing method, and there can be a case where a plurality of steps are associated with one step and a case where one step is associated with a plurality of steps. Thus, each step in the method for manufacturing the negative electrode active material of one embodiment of the present invention is not limited to the above and can be changed as appropriate in some cases. Specifically, in some cases, the order of steps can be changed, a step can be added or omitted, for example, depending on circumstances.

Note that this embodiment can be combined with the other embodiments and/or the example in this specification as appropriate.

Embodiment 2

Described in this embodiment are examples of materials that can be used for a secondary battery including the negative electrode active material described in the above embodiment. Specifically, a secondary battery in which a positive electrode, a negative electrode, and an electrolyte solution are wrapped in an exterior body is described as an example.

<Positive Electrode>

The positive electrode includes a positive electrode active material layer and a positive electrode current collector.

<<Positive Electrode Active Material>>

The positive electrode active material layer contains at least a positive electrode active material. The positive electrode active material layer may contain, in addition to the positive electrode active material, other materials such as a coating film of the active material surface, a conductive additive, and a binder.

As the positive electrode active material, for example, an oxide or a composite oxide having an olivine crystal structure, a layered rock-salt crystal structure, or a spinel crystal structure can be used.

As the composite oxide with an olivine crystal structure, for example, a composite oxide represented by general formula $LiMPO_4$ (M is one or more of Fe(II), Mn(II), Co(II), and Ni(II))) can be used. Typical examples of the general formula $LiMPO_4$ used as a material include lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

In particular, $LiFePO_4$ is preferable because it meets requirements with balance for the positive electrode active material, such as safety, stability, high capacity density, high potential, and the existence of lithium ions that can be extracted in initial oxidation (charging).

Examples of the composite oxide with a layered rock-salt crystal structure include lithium cobalt oxide ($LiCoO_2$), $LiNiO_2$, $LiMnO_2$, and $Li_2MnO_3$. Other examples include an NiCo-based material (general formula: $LiNi_xCo_{1-x}O_2$ (0<x<1)) such as $LiNi_{0.8}Co_{0.2}O_2$; an NiMn-based material (general formula: $LiNi_xMn_{1-x}O_2$ (0<x<1)) such as $LiNi_{0.5}Mn_{0.5}O_2$; and an NiMnCo-based material (also referred to as NMC, general formula: $LiNi_xMn_yCo_{1-x-y}O_2$ (x>0, y>0, x+y<1)) such as $LiNi_{1/3}Mn_{1/3}Co_{1/3}O_2$. Furthermore, $Li(Ni_{0.8}Co_{0.15}Al_{0.05})O_2$, $Li_2MnO_3$-$LiMO_2$ (M=Co, Ni, or Mn), and the like can be given as the examples.

Examples of the composite oxide with a spinel crystal structure include $LiMn_2O_4$, $Li_{1+x}Mn_{2-x}O_4$ (0<x<2), $LiMn_{2-x}Al_xO_4$ (0<x<2), and $LiMn_{1.5}Ni_{0.5}O_4$.

It is preferable to mix a small amount of lithium nickel oxide ($LiNiO_2$ or $LiNi_{1-x}M_xO_2$ (M=Co, Al, or the like, 0<x<1)) in $LiMn_2O_4$ or the like having a spinel crystal structure, in which case the dissolution of manganese and the decomposition of an electrolyte solution can be inhibited, for example.

Alternatively, a composite material such as general formula $Li_{(2-j)}MSiO_4$ (M is one or more of Fe(II), Mn(II), Co(II), and Ni(II); 0≤j≤2) can be used as the positive electrode active material. Typical examples of the general formula $Li_{2-j}MSiO_4$ include lithium compounds such as $Li_{2-j}FeSiO_4$, $Li_{2-j}NiSiO_4$, $Li_{2-j}CoSiO_4$, $Li_{2-j}MnSiO_4$, $Li_{2-j}Fe_kNi_lSiO_4$, $Li_{2-j}Fe_kCo_lSiO_4$, $Li_{2-j}Fe_kMn_lSiO_4$, $Li_{2-j}Ni_kCo_lSiO_4$, $Li_{2-j}Ni_kMn_lSiO_4$ (k+l≤1, 0<k<1, and 0<l<1), $Li_{2-j}Fe_mNi_nCo_qSiO_4$, $Li_{2-j}Fe_mNi_nMn_qSiO_4$, $Li_{2-j}Ni_mCo_nMn_qSiO_4$ (m+n+q≤1, 0<m<1, 0<n<1, and 0<q<1), and $Li_{2-j}Fe_rNi_sCo_tMn_uSiO_4$ (r+s+t+u≤1, 0<r<1, 0<s<1, 0<t<1, and 0<u<1).

Still alternatively, a NASICON compound represented by a general formula $A_xM_2(XO_4)_3$ (A=Li, Na, or Mg, M=Fe, Mn, Ti, V, Nb, or Al, X=S, P, Mo, W, As, or Si) can be used as the positive electrode active material. Examples of the NASICON compound include $Fe_2(MnO_4)_3$, $Fe_2(SO_4)_3$, and $Li_3Fe_2(PO_4)_3$. Further alternatively, a compound represented by a general formula $Li_2MPO_4F$, $Li_2MP_2O_7$, or $Li_5MO_4$ (M=Fe or Mn), a perovskite fluoride such as $NaFeF_3$ or $FeF_3$, a metal chalcogenide (a sulfide, a selenide, or a telluride) such as $TiS_2$ and $MoS_2$, an oxide with an inverse spinel structure such as $LiMVO_4$, vanadium oxides ($V_2O_5$, $V_6O_{13}$, $LiV_3O_8$, and the like), a manganese oxide, or an organic sulfur compound can be used as the positive electrode active material.

Examples of the conductive additive include a carbon material, a metal material, and a conductive ceramic material. Alternatively, a fiber material may be used as the conductive additive. The content of the conductive additive to the total amount of the active material layer is preferably greater than or equal to 1 wt % and less than or equal to 10 wt %, further preferably greater than or equal to 1 wt % and less than or equal to 5 wt %.

In the case where a carbon material is used as the conductive additive, for example, any of natural graphite, artificial graphite such as mesocarbon microbeads, and carbon fiber can be selected. For example, carbon fiber such as mesophase pitch-based carbon fiber or isotropic pitch-based carbon fiber can be used as the carbon fiber. Alternatively, carbon nanofiber, carbon nanotube, or the like can be used as the carbon fiber. Other examples of the carbon material include carbon black (e.g., acetylene black), graphite (black lead) particles, graphene, and fullerene.

In the case where metal fibers are used as the conductive additive, metal powder of copper, nickel, aluminum, silver, gold, or the like can be selected.

The aforementioned conductive additive allows a network for electric conduction to be formed in the active material layer, and a path for electric conduction between active materials to be maintained. That is, the addition of the conductive additive to the active material layer increases the electric conductivity of the active material layer.

As the binder, a rubber material such as styrene-butadiene rubber (SBR), styrene-isoprene-styrene rubber, acrylonitrile-butadiene rubber, butadiene rubber, or ethylene-propylene-diene copolymer can be used, for example. Alternatively, fluororubber can be used as the binder.

For the binder, for example, water-soluble polymers are preferably used. As the water-soluble polymers, for example, a polysaccharide can be used. As the polysaccharide, for example, a cellulose derivative such as carboxymethyl cellulose (CMC), methyl cellulose, ethyl cellulose, hydroxypropyl cellulose, diacetyl cellulose, and regenerated cellulose or starch can be used. It is further preferred that such water-soluble polymers be used in combination with any of the above rubber materials.

Alternatively, for the binder, a material such as polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, polyisobutylene, polyethylene terephthalate, nylon, polyvinylidene fluoride (PVdF), polyacrylonitrile (PAN), ethylene-propylene-diene polymer, polyvinyl acetate, or nitrocellulose is preferably used.

A plurality of the above materials may be used in combination for the binder.

For example, a material having a significant viscosity modifying effect and another material may be used in combination. For example, a rubber material or the like has high adhesion or high elasticity but may have difficulty in viscosity modification when mixed in a solvent. In such a case, a rubber material or the like is preferably mixed with a material having a significant viscosity modifying effect, for example. As a material having a significant viscosity modifying effect, for example, a water-soluble polymer may be used. An example of a water-soluble polymer having a significant viscosity modifying effect is the above-mentioned polysaccharide; for example, a cellulose derivative such as carboxymethyl cellulose (CMC), methyl cellulose, ethyl cellulose, hydroxypropyl cellulose, diacetyl cellulose, or regenerated cellulose, or starch can be used.

Note that a cellulose derivative such as carboxymethyl cellulose obtains a higher solubility when converted into a salt such as a sodium salt or an ammonium salt of carboxymethyl cellulose, and accordingly, easily exerts an effect as a viscosity modifier. The high solubility can also increase the dispersibility of an active material and other components in the formation of a slurry for an electrode. In this specification, cellulose and a cellulose derivative used as a binder of an electrode include salts thereof.

The water-soluble polymers stabilize viscosity by being dissolved in water and allow stable dispersion of the active material and another material combined as a binder, such as styrene-butadiene rubber, in an aqueous solution. Furthermore, a water-soluble polymer is expected to be easily and stably adsorbed to an active material surface because it has a functional group. Many cellulose derivatives such as carboxymethyl cellulose have functional groups such as a hydroxyl group and a carboxyl group. Because of functional groups, polymers are expected to interact with each other and cover a large area of an active material surface.

In the case where the binder covering or being in contact with the active material surface forms a film, the film is expected to serve as a passivation film to inhibit the decomposition of the electrolyte solution. Here, the passivation film refers to a film without electric conductivity or a film with extremely low electric conductivity, and can inhibit the decomposition of an electrolyte solution at a battery reaction potential in the case where the passivation film is formed on the active material surface, for example. It is further desirable that the passivation film can conduct lithium ions while suppressing electric conduction.

<<Positive Electrode Current Collector>>

The positive electrode current collector can be formed using a material that has high conductivity, such as a metal like stainless steel, gold, platinum, aluminum, and titanium, or an alloy thereof. It is preferable that a material used for the positive electrode current collector not dissolve at the potential of the positive electrode. It is also possible to use an aluminum alloy to which an element that improves heat resistance, such as silicon, titanium, neodymium, scandium, or molybdenum, is added. Alternatively, a metal element that forms a silicide by reacting with silicon may be used. Examples of the metal element that forms a silicide by reacting with silicon include zirconium, titanium, hafnium, vanadium, niobium, tantalum, chromium, molybdenum, tungsten, cobalt, and nickel. The current collector can have any of various shapes including a foil-like shape, a plate-like shape (sheet-like shape), a net-like shape, a punching-metal shape, and an expanded-metal shape. The current collector preferably has a thickness of greater than or equal to 5 μm and less than or equal to 30 μm.

<Electrolyte Solution>

The electrolyte solution contains a solvent and an electrolyte. As the solvent of the electrolyte solution, an aprotic organic solvent is preferably used; for example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, ethyl acetate, methyl propionate, ethyl propionate, propyl propionate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

Alternatively, the use of one or more ionic liquids (room temperature molten salts) that are less likely to burn and volatize as the solvent of the electrolyte solution can prevent a secondary battery from exploding or catching fire even when the secondary battery internally shorts out or the internal temperature increases owing to overcharging or the like. An ionic liquid is composed of a cation and an anion, and contains an organic cation and an anion. Examples of the organic cation used for the electrolyte solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolyte solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

As an electrolyte dissolved in the above-described solvent, one of lithium salts such as $LiPF_6$, $LiClO_4$, $LiAsF_6$, $LiBF_4$, $LiAlCl_4$, $LiSCN$, $LiBr$, $LiI$, $Li_2SO_4$, $Li_2B_{10}Cl_{10}$, $Li_2B_{12}C_{12}$, $LiCF_3SO_3$, $LiC_4F_9SO_3$, $LiC(CF_3SO_2)_3$, $LiC(C_2F_5SO_2)_3$, $LiN(FSO_2)_2$, $LiN(CF_3SO_2)_2$, $LiN(C_4F_9SO_2)$ $(CF_3SO_2)$, and $LiN(C_2F_5SO_2)_2$ can be used, or two or more of these lithium salts can be used in an appropriate combination in an appropriate ratio.

The electrolyte solution used for a secondary battery is preferably highly purified and contains small numbers of dust particles and elements other than the constituent elements of the electrolyte solution (hereinafter, also simply referred to as impurities). Specifically, the weight ratio of impurities to the electrolyte solution is less than or equal to 1%, preferably less than or equal to 0.1%, and further preferably less than or equal to 0.01%.

Furthermore, an additive agent such as vinylene carbonate, propane sultone (PS), tert-butylbenzene (TBB), fluoroethylene carbonate (FEC), lithium bis(oxalate)borate (LiBOB), or a dinitrile compound such as succinonitrile or adiponitrile may be added to the electrolyte solution. The concentration of a material to be added in the whole solvent is, for example, higher than or equal to 0.1 wt % and lower than or equal to 5 wt %.

Alternatively, a polymer gelled electrolyte obtained in such a manner that a polymer is swelled with an electrolyte solution may be used.

When a polymer gel electrolyte is used, safety against liquid leakage and the like is improved. Furthermore, a secondary battery can be thinner and more lightweight.

As a polymer that undergoes gelation, a silicone gel, an acrylic gel, an acrylonitrile gel, a polyethylene oxide-based gel, a polypropylene oxide-based gel, a fluorine-based polymer gel, or the like can be used.

As the polymer, for example, a polymer having a polyalkylene oxide structure, such as polyethylene oxide (PEO); PVDF; polyacrylonitrile; a copolymer containing any of them, or the like can be used. For example, PVDF-HFP, which is a copolymer of PVDF and hexafluoropropylene (HFP) can be used. The formed polymer may have a porous shape.

Instead of the electrolyte solution, a solid electrolyte including an inorganic material such as a sulfide-based inorganic material or an oxide-based inorganic material, or a solid electrolyte including a high-molecular material such as a PEO (polyethylene oxide)-based material can alternatively be used. When the solid electrolyte is used, a separator and a spacer do not need to be provided. Furthermore, the battery can be entirely solidified; therefore, there is no possibility of liquid leakage and the safety of the battery is dramatically increased.

<Separator>

The secondary battery preferably includes a separator. As the separator, for example, paper; nonwoven fabric; glass fiber; ceramics; or synthetic fiber containing nylon (polyamide), vinylon (polyvinyl alcohol-based fiber), polyester, acrylic, polyolefin, or polyurethane can be used. The separator is preferably processed to have an envelope-like shape to wrap either one of the positive electrode and the negative electrode.

The separator may have a multilayer structure. For example, an organic material film such as polypropylene or polyethylene can be coated with a ceramic-based material, a fluorine-based material, a polyamide-based material, a mixture thereof, or the like. As the ceramic-based material, for example, aluminum oxide particles, silicon oxide particles, or the like can be used. As the fluorine-based material, for example, PVDF, polytetrafluoroethylene, or the like can be used. As the polyamide-based material, for example, nylon, aramid (meta-based aramid or para-based aramid), or the like can be used.

When the separator is coated with the ceramic-based material, deterioration of the separator in charging and discharging at high voltage can be suppressed and the reliability of the secondary battery can be improved because oxidation resistance is improved. In addition, when the separator is coated with the fluorine-based material, the separator is easily brought into close contact with an electrode, resulting in high output characteristics. When the separator is coated with the polyamide-based material, in particular, aramid, the safety of the secondary battery is improved because heat resistance is improved.

For example, both surfaces of a polypropylene film may be coated with a mixed material of aluminum oxide and aramid. Alternatively, a surface of the polypropylene film that is in contact with the positive electrode may be coated with the mixed material of aluminum oxide and aramid, and a surface of the polypropylene film that is in contact with the negative electrode may be coated with the fluorine-based material.

With the use of a separator having a multilayer structure, the capacity per volume of the secondary battery can be increased because the safety of the secondary battery can be maintained even when the total thickness of the separator is small.

<Exterior Body>

For an exterior body included in the secondary battery, a metal material such as aluminum or a resin material can be used, for example. An exterior body in the form of a film can also be used. As the film, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

<Charging and Discharging Methods>

The secondary battery can be charged and discharged in the following manner, for example.

<<CC Charging>>

Figure 5A:
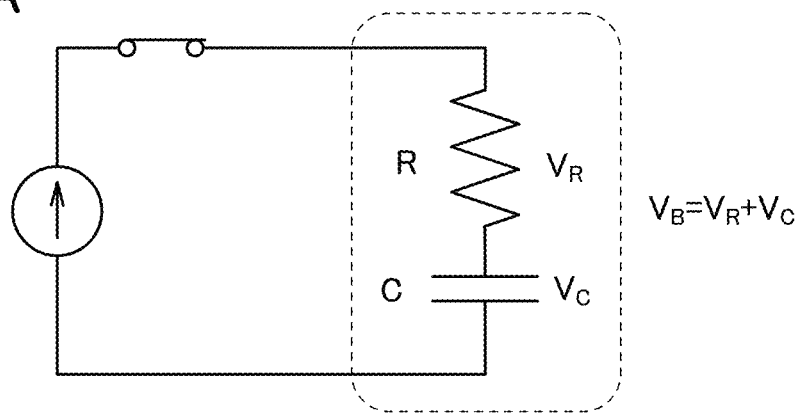
FIGS. 5A to 5C Diagrams illustrating a charging method of a secondary battery.

First, CC charging is described as one of charging methods. CC charging is a charging method in which a constant current is made to flow to a secondary battery in the whole charging period and charging is terminated when the voltage reaches a predetermined voltage. The secondary battery is assumed to be an equivalent circuit with internal resistance R and secondary battery capacitance C as shown in FIG. 5(A). In that case, a secondary battery voltage $V_B$ is the sum of a voltage $V_R$ applied to the internal resistance R and a voltage $V_C$ applied to the secondary battery capacitance C, i.e., $V_B=V_R+V_C$.

While the CC charging is performed, a switch is on as shown in FIG. 5(A), so that a constant current I flows to the secondary battery. During the period, the current I is constant; thus, in accordance with the Ohm's law, $V_R=R \times I$, the voltage $V_R$ applied to the internal resistance R is also constant. In contrast, the voltage $V_C$ applied to the secondary battery capacitance C increases over time. Accordingly, the secondary battery voltage $V_B$ increases over time.

Figure 5B:
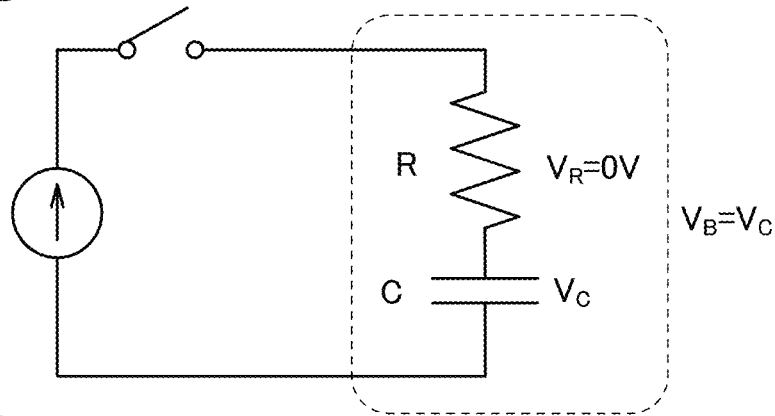

When the secondary battery voltage $V_B$ reaches a predetermined voltage, e.g., 4.3 V, the charging is terminated. On termination of the CC charging, the switch is turned off as shown in FIG. 5(B), and the current I becomes 0. Thus, the voltage $V_R$ applied to the internal resistance R becomes 0 V, and the secondary battery voltage $V_B$ becomes equal to $V_C$. Consequently, the secondary battery voltage $V_B$ is decreased by the lost voltage drop in the internal resistance R during termination of charging compared with immediately before termination of the CC charging.

Figure 5C:
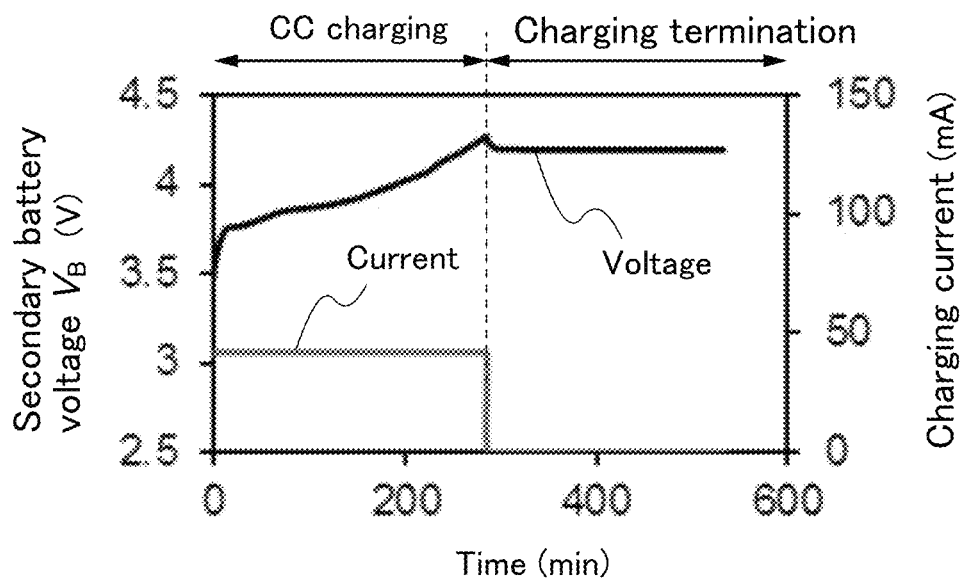

FIG. 5(C) shows an example of a change over time of the secondary battery voltage $V_B$ and charging current while the CC charging is performed and after the CC charging is terminated. As shown in FIG. 5(C), the secondary battery voltage $V_B$ increases while the CC charging is performed, and slightly decreases after the CC charging is terminated.

<<CCCV Charging>>

Next, CCCV charging, which is a charging method different from the above-described method, is described. CCCV charging is a charging method in which CC charging is performed until the voltage reaches a predetermined voltage and then constant voltage (CV) charging is performed until the amount of current flow becomes small, specifically, reaches a termination current value.

Figure 6A:
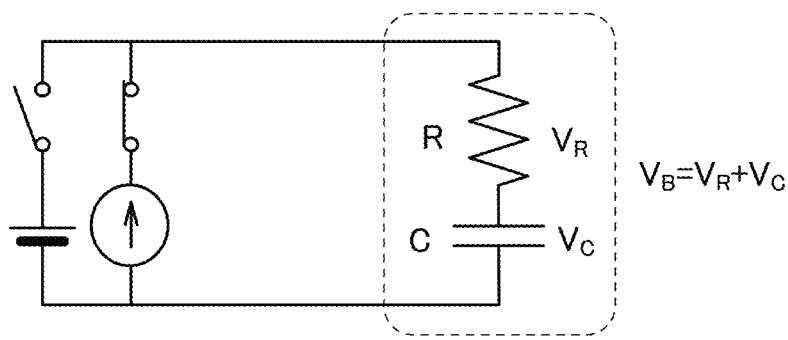
FIGS. 6A to 6D Diagrams illustrating a charging method of a secondary battery.

While the CC charging is performed, a switch of a constant current power source is on and a switch of a constant voltage power source is off as shown in FIG. 6(A), so that the constant current I flows to the secondary battery. During the period, the current I is constant; thus, in accordance with the Ohm's law, $V_R=R \times I$, the voltage $V_R$ applied to the internal resistance R is also constant. In contrast, voltage $V_C$ applied to the secondary battery capacitance C increases over time. Accordingly, the secondary battery voltage $V_B$ increases over time because $V_B=V_R+V_C$ is satisfied.

Figure 6B:
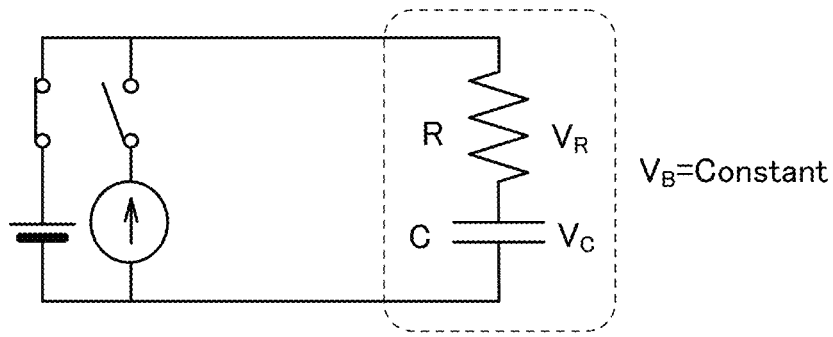

When the secondary battery voltage $V_B$ reaches a predetermined voltage, e.g., 4.3 V, the CC charging is switched to the CV charging. While the CV charging is performed, the switch of the constant voltage power source is on and the switch of the constant current power source is off as shown in FIG. 6(B); thus, the secondary battery voltage $V_B$ is constant. In contrast, the voltage $V_C$ applied to the secondary battery capacitance C increases over time. Since $V_B=V_RV_C$ is satisfied, the voltage $V_R$ applied to the internal resistance R decreases over time. As the voltage $V_R$ applied to the internal resistance R decreases, the current I flowing to the secondary battery also decreases in accordance with the Ohm's law, $V_R=R \times I$.

Figure 6C:
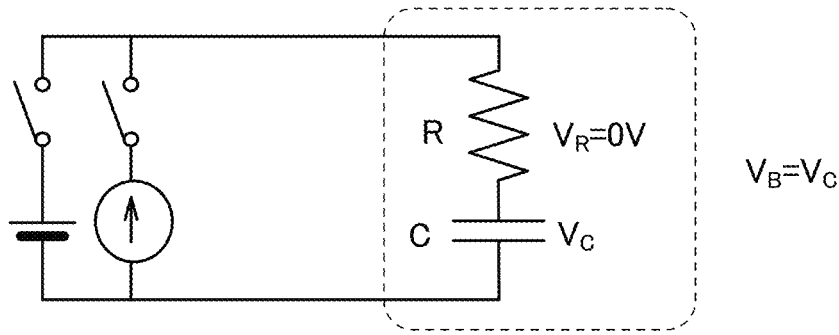

When the current I flowing to the secondary battery becomes a predetermined current, e.g., approximately 0.01 C, charging is terminated. On termination of the CCCV charging, all the switches are turned off as shown in FIG. 6(C), so that the current I becomes 0. Thus, the voltage $V_R$ applied to the internal resistance R becomes 0 V, and $V_B$ becomes equal to $V_C$. However, the voltage $V_R$ applied to the internal resistance R becomes sufficiently small by the CV charging; thus, even when a voltage drop no longer occurs in the internal resistance R, the secondary battery voltage $V_B$ hardly decreases.

Figure 6D:
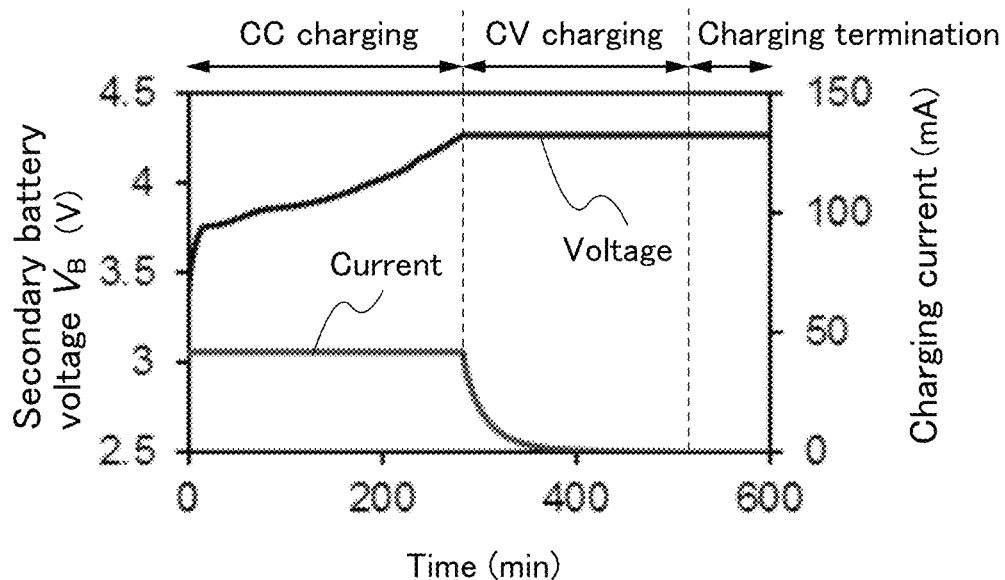

FIG. 6(D) shows an example of a change over time of the secondary battery voltage $V_B$ and charging current while the CCCV charging is performed and after the CCCV charging is terminated. As shown in FIG. 6(D), the secondary battery voltage $V_B$ hardly decreases even after the CCCV charging is terminated.

<<CC Discharging>>

Next, CC discharging, which is one of discharging methods, is described. CC discharging is a discharging method in which a constant current is made to flow from the secondary battery in the whole discharging period, and discharging is terminated when the secondary battery voltage $V_B$ reaches a predetermined voltage, e.g., 2.5 V.

Figure 7:
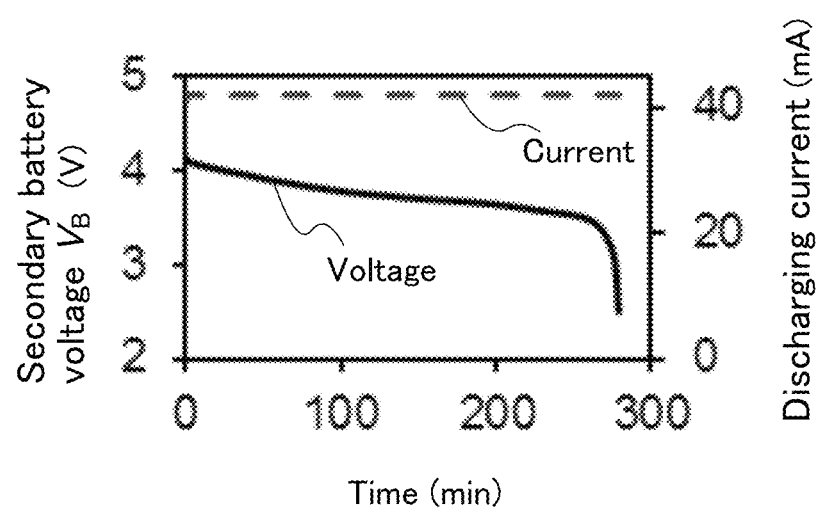
FIG. 7 A diagram illustrating a discharging method of a secondary battery.

FIG. 7 shows an example of a change over time of the secondary battery voltage $V_B$ and discharging current while the CC discharging is performed. As discharging proceeds, the secondary battery voltage $V_B$ decreases as shown in FIG. 7.

Next, a discharge rate and a charge rate are described. The discharge rate refers to the relative ratio of current in discharging to battery capacity and is expressed in a unit C. A current corresponding to 1 C in a battery with a rated capacity X (Ah) is X (A). The case where discharging is performed at a current of 2X (A) is rephrased as to perform discharging at 2 C, and the case where discharging is performed at a current of X/5 (A) is rephrased as to perform discharging at 0.2 C. The same applies to the charge rate; the case where charging is performed at a current of 2X (A) is rephrased as to perform charging at 2 C, and the case where charging is performed at a current of X/5 (A) is rephrased as to perform charging at 0.2 C.

Note that this embodiment can be combined with the other embodiments and/or the example in this specification as appropriate.

Embodiment 3

Described in this embodiment are examples of a shape of a secondary battery including the negative electrode 100 described in the above embodiment. For the materials used for the secondary battery described in this embodiment, the description of the above embodiment can be referred to.

[Coin-Type Secondary Battery]

Figure 8A:
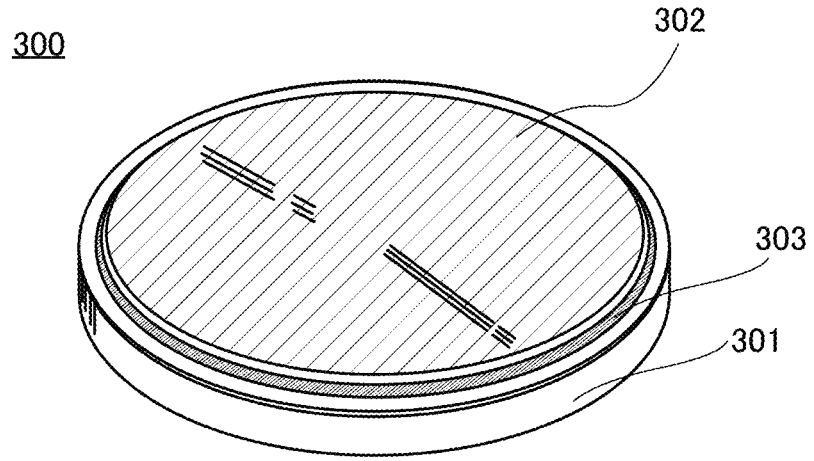
FIGS. 8A to 8C Diagrams illustrating a coin-type secondary battery.
Figure 8B:
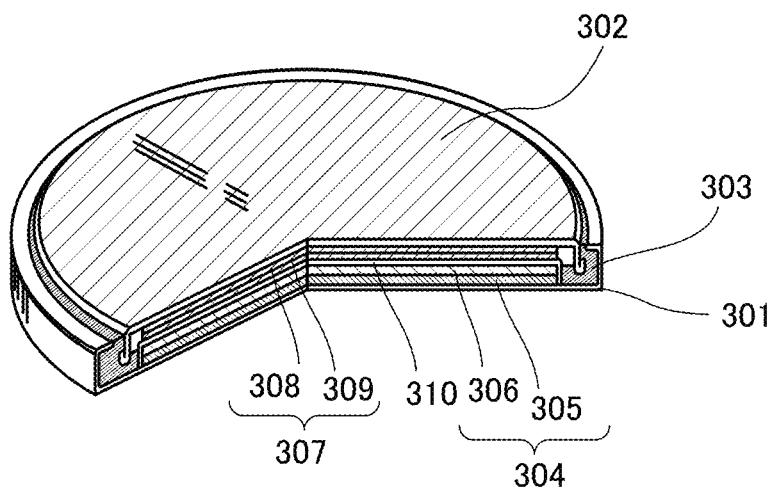

First, an example of a coin-type secondary battery is described. FIG. 8(A) is an external view of a coin-type (single-layer flat type) secondary battery, and FIG. 8(B) is a cross-sectional view thereof.

In a coin-type secondary battery 300, a positive electrode can 301 doubling as a positive electrode terminal and a negative electrode can 302 doubling as a negative electrode terminal are insulated and sealed by a gasket 303 made of polypropylene or the like. A positive electrode 304 includes a positive electrode current collector 305 and a positive electrode active material layer 306 provided in contact with the positive electrode current collector 305. A negative electrode 307 includes a negative electrode current collector 308 and a negative electrode active material layer 309 provided in contact with the negative electrode current collector 308.

Note that an active material layer may be formed over only one surface of each of the positive electrode 304 and the negative electrode 307 used for the coin-type secondary battery 300.

For the positive electrode can 301 and the negative electrode can 302, a metal having corrosion resistance to an electrolyte solution, such as nickel, aluminum, or titanium, an alloy of such a metal, or an alloy of such a metal and another metal (e.g., stainless steel) can be used. Alternatively, the positive electrode can 301 and the negative electrode can 302 are preferably covered with nickel, aluminum, or the like in order to prevent corrosion due to the electrolyte solution. The positive electrode can 301 and the negative electrode can 302 are electrically connected to the positive electrode 304 and the negative electrode 307, respectively.

The negative electrode 307, the positive electrode 304, and a separator 310 are immersed in the electrolyte solution; then, as shown in FIG. 8(B), the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 located therebetween, whereby the coin-type secondary battery 300 is manufactured.

When the negative electrode active material described in the above embodiment is used in the negative electrode 307, the coin-type secondary battery 300 with high capacity and excellent cycle performance can be obtained.

Here, a current flow in charging a secondary battery is described with reference to FIG. 8(C). When a secondary battery using lithium is regarded as a closed circuit, lithium ions transfer and a current flows in the same direction. Note that in the secondary battery using lithium, an anode and a cathode change places in charging and discharging, and an oxidation reaction and a reduction reaction occur on the opposite sides; hence, an electrode with a high reaction potential is called a positive electrode and an electrode with a low reaction potential is called a negative electrode. For this reason, in this specification, the positive electrode is referred to as a "positive electrode" or a "+electrode (plus electrode)" and the negative electrode is referred to as a "negative electrode" or a "−electrode (minus electrode)" in all the cases where charging is performed, discharging is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, it should be mentioned that the anode or the cathode is which of the one at the time of charging or the one at the time of discharging and corresponds to which of a positive electrode (plus electrode) or a negative electrode (minus electrode).

Figure 8C:
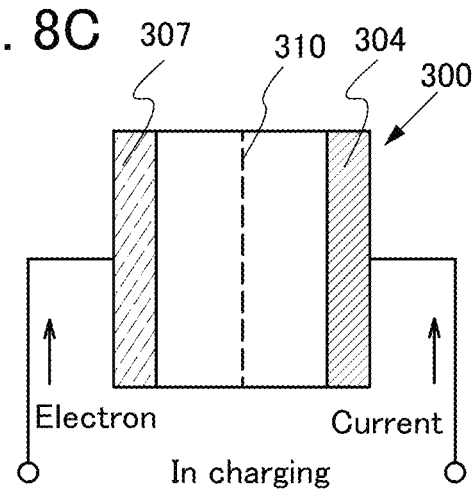

Two terminals shown in FIG. 8(C) are connected to a charger, and the secondary battery 300 is charged. As the charging of the secondary battery 300 proceeds, a potential difference between electrodes increases.

[Cylindrical Secondary Battery]

Figure 9A:
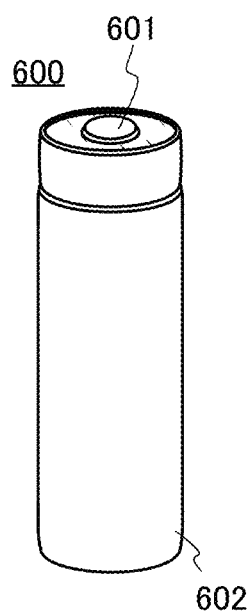
FIGS. 9A to 9D Diagrams illustrating a cylindrical secondary battery.
Figure 9B:
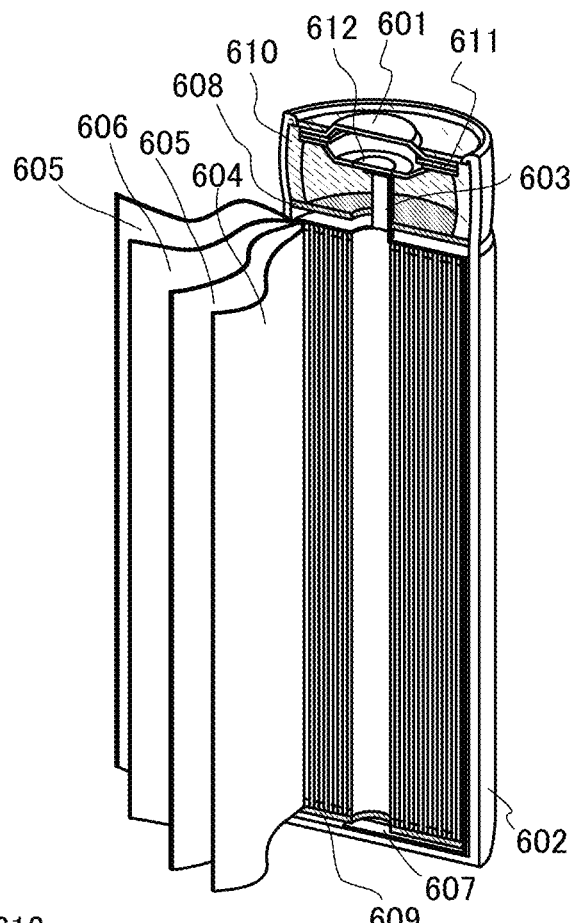

Next, an example of a cylindrical secondary battery is described with reference to FIG. 9. A cylindrical secondary battery 600 includes, as shown in FIGS. 9(A) and 9(B), a positive electrode cap (battery lid) 601 on the top surface and a battery can (outer can) 602 on the side and bottom surfaces. The positive electrode cap and the battery can (outer can) 602 are insulated by a gasket (insulating gasket) 610.

FIG. 9(B) is a diagram schematically showing a cross section of the cylindrical secondary battery. Inside the battery can 602 having a hollow cylindrical shape, a battery element in which a strip-like positive electrode 604 and a strip-like negative electrode 606 are wound with a separator 605 located therebetween is provided. Although not shown, the battery element is wound around a center pin. One end of the battery can 602 is closed and the other end thereof is opened. For the battery can 602, a metal having corrosion resistance to an electrolyte solution, such as nickel, aluminum, or titanium, an alloy of such a metal, or an alloy of such a metal and another metal (e.g., stainless steel) can be used. Alternatively, the battery can 602 is preferably covered with nickel, aluminum, or the like in order to prevent corrosion due to the electrolyte solution. Inside the battery can 602, the battery element in which the positive electrode, the negative electrode, and the separator are wound is provided between a pair of insulating plates 608 and 609 that face each other. Furthermore, a nonaqueous electrolyte solution (not shown) is injected inside the battery can 602 provided with the battery element. As the nonaqueous electrolyte solution, a nonaqueous electrolyte solution that is similar to that of the coin-type secondary battery can be used.

Since the positive electrode and the negative electrode used for the cylindrical storage battery are wound, active materials are preferably formed on both surfaces of the current collector. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Barium titanate ($BaTiO_3$)-based semiconductor ceramic can be used for the PTC element.

Figure 9C:
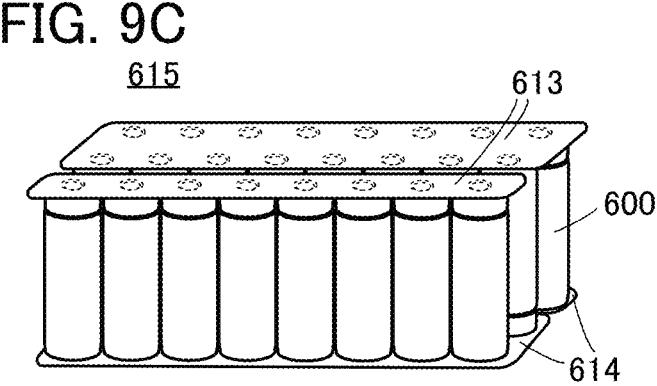

Alternatively, as shown in FIG. 9(C), a plurality of secondary batteries 600 may be provided between a conductive plate 613 and a conductive plate 614 to form a module 615. The plurality of secondary batteries 600 may be connected in parallel, connected in series, or further connected in series after being connected in parallel. With the module 615 including the plurality of secondary batteries 600, large electric power can be extracted.

Figure 9D:
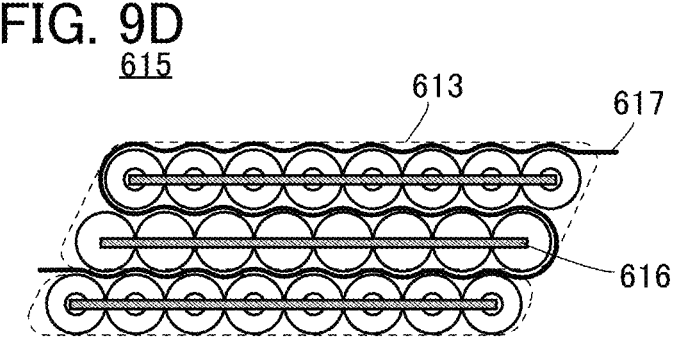

FIG. 9(D) is a top view of the module 615. The conductive plate 613 is shown by a dotted line for clarity of the drawing. As shown in FIG. 9(D), the module 615 may include a wiring 616 electrically connecting the plurality of secondary batteries 600 with each other. It is possible to provide the conductive plate over the wiring 616 to overlap with each other. In addition, a temperature control device 617 may be provided between the plurality of secondary batteries 600. The secondary batteries 600 can be cooled with the temperature control device 617 when overheated, whereas the secondary batteries 600 can be heated with the temperature control device 617 when cooled too much. Thus, the performance of the module 615 is less likely to be influenced by the outside temperature. A heating medium included in the temperature control device 617 preferably has an insulating property and incombustibility.

When the negative electrode active material described in the above embodiment is used in the negative electrode 606, the cylindrical secondary battery 600 with high capacity and excellent cycle performance can be obtained.

[Solid-State Battery]

Figure 10:
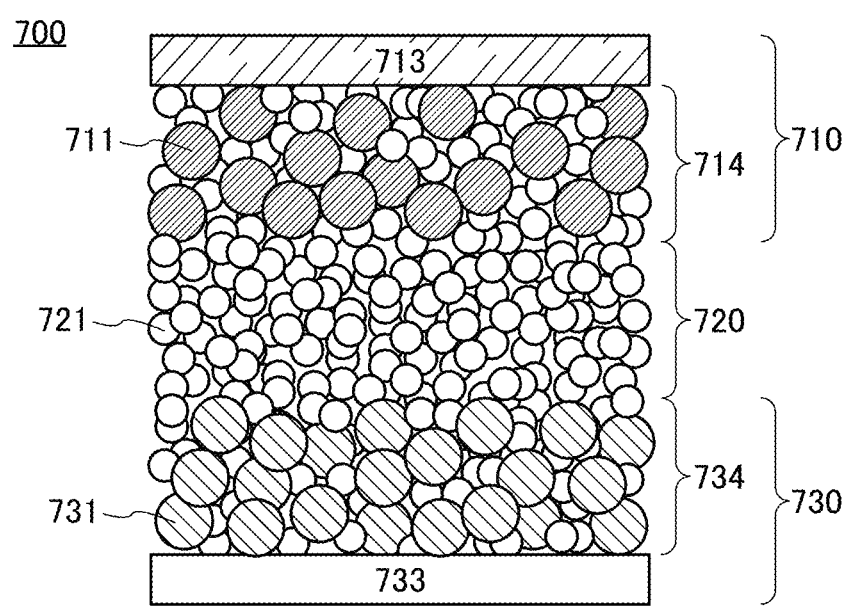
FIG. 10 A diagram illustrating a solid-state battery.

Next, an example of a solid-state battery is described. The negative electrode of one embodiment of the present invention can be used for a solid-state battery. FIG. 10 shows a positive electrode, a solid electrolyte, and a negative electrode of a solid-state battery. A secondary battery 700 shown in FIG. 10 includes a positive electrode 710, a solid electrolyte layer 720, and a negative electrode 730.

The positive electrode 710 includes a positive electrode current collector 713 and a positive electrode active material layer 714. The positive electrode active material layer 714 includes a positive electrode active material 711 and a solid electrolyte 721. The positive electrode active material layer 714 may also include a conductive additive and a binder.

The solid electrolyte layer 720 includes the solid electrolyte 721. The solid electrolyte layer 720 is positioned between the positive electrode 710 and the negative electrode 730, and is a region that includes neither the positive electrode active material 711 nor a negative electrode active material 731.

The negative electrode 730 includes a negative electrode current collector 733 and a negative electrode active material layer 734. The negative electrode active material layer 734 includes the negative electrode active material 731 and the solid electrolyte 721.

The negative electrode of one embodiment of the present invention can be used as the negative electrode 730 of the secondary battery 700 shown in FIG. 10. Specifically, the secondary battery 700 can have a structure in which lithium-conductive ceramic such as LTPO or LATP is used for the solid electrolyte 721 and silicon is used for the negative electrode active material 731.

Note that this embodiment can be combined with the other embodiments and/or the example in this specification as appropriate.

Embodiment 4

In this embodiment, examples of incorporating the secondary battery of one embodiment of the present invention in electronic devices are described.

<Tablet Terminal>

First, FIG. 11(A) and FIG. 11(B) show an example of a tablet terminal that can be folded in half. A tablet terminal 9600 shown in FIG. 11(A) and FIG. 11(B) includes a housing 9630*a*, a housing 9630*b*, a movable portion 9640 that connects the housings 9630*a* and 9630*b*, a display portion 9631, a switch 9625 to a switch 9627, a fastener 9629, and an operation switch 9628. When a flexible panel is used for the display portion 9631, a tablet terminal with a larger display portion can be provided. FIG. 11(A) shows the tablet terminal 9600 that is opened, and FIG. 11(B) shows the tablet terminal 9600 that is closed.

The tablet terminal 9600 includes a power storage unit 9635 inside the housing 9630*a* and the housing 9630*b*. The power storage unit 9635 is provided across the housing 9630*a* and the housing 9630*b*, passing through the movable portion 9640.

Part of or the entire display portion 9631 can be a touch panel region, and data can be input when a displayed operation key 9638 is touched. For example, it is possible that keyboard buttons are displayed on the display portion 9631 on the housing 9630*a* side, and text, information, an image, or the like is displayed on the display portion 9631 on the housing 9630*b* side.

It is also possible that a keyboard is displayed on the display portion 9631 on the housing 9630*b* side, and text, information, an image, or the like is displayed on the display portion 9631 on the housing 9630*a* side. Furthermore, it is possible that a button for switching keyboard display on a touch panel is displayed on the display portion 9631 and the button is touched with a finger, a stylus, or the like to display keyboard buttons on the display portion 9631.

The switch 9625, the switch 9626, and the switch 9627 may function not only as an interface for operating the tablet terminal 9600 but also as an interface that can switch various functions. For example, at least one of the switch 9625 to the switch 9627 may function as a switch for switching power on/off of the tablet terminal 9600. For another example, at least one of the switch 9625 to the switch 9627 may have a function of switching display orientation between vertical display, horizontal display, and the like or a function of switching display between monochrome display and color display. For another example, at least one of the switch 9625 to the switch 9627 may have a function of adjusting the luminance of the display portion 9631. The luminance of the display portion 9631 can be optimized in accordance with the amount of external light in use that is measured with an optical sensor incorporated in the tablet terminal 9600. Note that another sensing device including a sensor for measuring inclination, such as a gyroscope sensor or an acceleration sensor, may be incorporated in the tablet terminal, in addition to the optical sensor.

The tablet terminal 9600 is folded in half in FIG. 11(B). The tablet terminal 9600 includes a housing 9630, a solar cell 9633, and a charge and discharge control circuit 9634 including a DCDC converter 9636. The secondary battery of one embodiment of the present invention is used as the power storage unit 9635.

As described above, the tablet terminal 9600 can be folded in half; thus, the tablet terminal 9600 can be folded such that the housing 9630a and the housing 9630b overlap with each other when not in use. The display portion 9631 can be protected owing to the folding, which increases the durability of the tablet terminal 9600. Since the power storage unit 9635 including the secondary battery of one embodiment of the present invention has high capacity and excellent cycle performance, the tablet terminal 9600 that can be used for a long time over a long period can be provided.

In addition, the tablet terminal 9600 illustrated in FIG. 11(A) and FIG. 11(B) can also have a function of displaying various kinds of information (e.g., a still image, a moving image, and a text image), a function of displaying a calendar, a date, or the time on the display portion, a touch-input function of operating or editing information displayed on the display portion by touch input, a function of controlling processing by various kinds of software (programs), and the like.

With the solar cell 9633, which is attached onto the surface of the tablet terminal 9600, electric power can be supplied to a touch panel, a display portion, a video signal processing portion, and the like. Note that the solar cell 9633 can be provided on one or both surfaces of the housing 9630 and the power storage unit 9635 can be charged efficiently. The use of a lithium-ion battery as the power storage unit 9635 brings an advantage such as a reduction in size.

The structure and operation of the charge and discharge control circuit 9634 shown in FIG. 11(B) are described with reference to a block diagram in FIG. 11(C). FIG. 11(C) shows the solar cell 9633, the power storage unit 9635, the DCDC converter 9636, a converter 9637, a switch SW1 to a switch SW3, and the display portion 9631, and the power storage unit 9635, the DCDC converter 9636, the converter 9637, and the switch SW1 to the switch SW3 correspond to the charge and discharge control circuit 9634 in FIG. 11(B).

First, an operation example in which electric power is generated by the solar cell 9633 using external light is described. The voltage of electric power generated by the solar cell is raised or lowered by the DCDC converter 9636 to a voltage for charging the power storage unit 9635. When the display portion 9631 is operated with the electric power from the solar cell 9633, the switch SW1 is turned on and the voltage of the electric power is raised or lowered by the converter 9637 to a voltage needed for the display portion 9631. When display on the display portion 9631 is not performed, the switch SW1 is turned off and the switch SW2 is turned on, so that the power storage unit 9635 can be charged.

Note that the solar cell 9633 is described as an example of a power generation unit; however, one embodiment of the present invention is not limited to this example, and the power storage unit 9635 may be charged using another power generation unit such as a piezoelectric element or a thermoelectric conversion element (Peltier element). For example, the power storage unit 9635 may be charged with a non-contact power transmission module that transmits and receives electric power wirelessly (without contact), or with a combination of other charging units.

<Home Electric Appliance>

Figure 12:
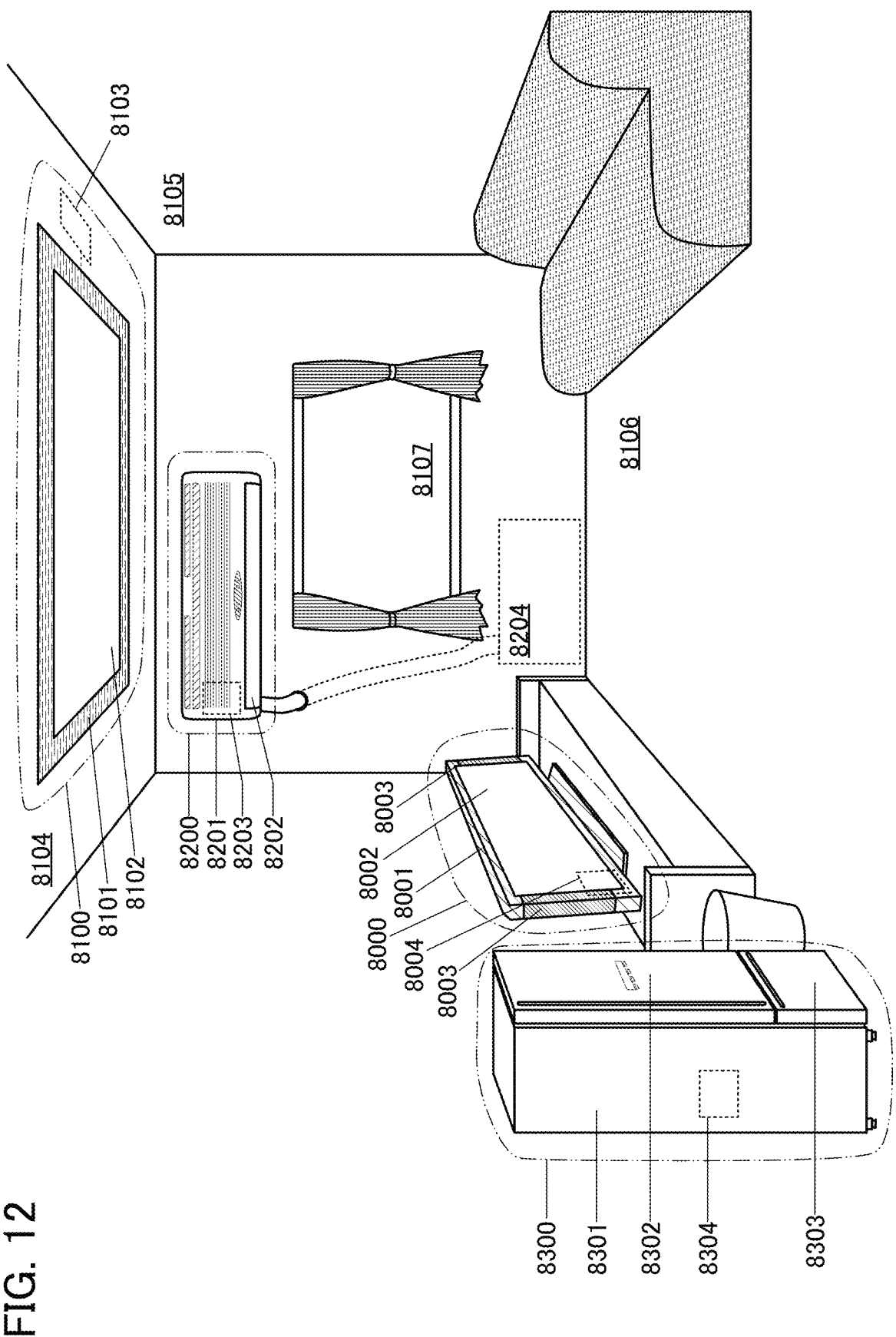
FIG. 12 Diagrams illustrating examples of electronic devices.

FIG. 12 shows examples of home electric appliances. In FIG. 12, a display device 8000 is an example of a home electric appliance using a secondary battery 8004 of one embodiment of the present invention. Specifically, the display device 8000 corresponds to a display device for TV broadcast reception and includes a housing 8001, a display portion 8002, speaker portions 8003, the secondary battery 8004, and the like. The secondary battery 8004 of one embodiment of the present invention is provided inside the housing 8001. The display device 8000 can receive electric power from a commercial power supply, or can use electric power stored in the secondary battery 8004. Thus, the display device 8000 can be utilized with the use of the secondary battery 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes all of information display devices for personal computers, advertisement displays, and the like besides TV broadcast reception.

In FIG. 12, an installation lighting device 8100 is an example of an electronic device using a secondary battery 8103 of one embodiment of the present invention. Specifically, the lighting device 8100 includes a housing 8101, a light source 8102, the secondary battery 8103, and the like. Although FIG. 12 illustrates the case where the secondary battery 8103 is provided inside a ceiling 8104 on which the housing 8101 and the light source 8102 are installed, the secondary battery 8103 may be provided inside the housing 8101. The lighting device 8100 can receive electric power from a commercial power supply, or can use electric power stored in the secondary battery 8103. Thus, the lighting device 8100 can be utilized with the use of the secondary battery 8103 of one embodiment of the present invention as an uninterruptible power supply even when electric power cannot be supplied from a commercial power supply due to power failure or the like.

Note that although FIG. 12 illustrates the installation lighting device 8100 provided in the ceiling 8104, the secondary battery of one embodiment of the present invention can be used in an installation lighting device provided in, for example, a wall 8105, a floor 8106, or a window 8107 other than the ceiling 8104, or the secondary battery of one embodiment of the present invention can be used in a tabletop lighting device or the like.

As the light source 8102, an artificial light source that emits light artificially by using electric power can be used. Specifically, an incandescent lamp, a discharge lamp such as a fluorescent lamp, and light-emitting elements such as an LED and an organic EL element are given as examples of the artificial light source.

In FIG. 12, an air conditioner including an indoor unit 8200 and an outdoor unit 8204 is an example of an electronic device using a secondary battery 8203 of one embodiment of the present invention. Specifically, the indoor unit 8200 includes a housing 8201, an air outlet 8202, the secondary battery 8203, and the like. Although FIG. 12 illustrates the case where the secondary battery 8203 is provided in the indoor unit 8200, the secondary battery 8203 may be provided in the outdoor unit 8204. Alternatively, the secondary batteries 8203 may be provided in both the indoor unit 8200 and the outdoor unit 8204. The air conditioner can receive electric power from a commercial power supply, or can use electric power stored in the secondary battery 8203. Particularly in the case where the secondary batteries 8203 are provided in both the indoor unit 8200 and the outdoor unit 8204, the air conditioner can be utilized with the use of the secondary battery 8203 of one embodiment of the present invention as an uninterruptible power supply even when electric power cannot be supplied from a commercial power supply due to power failure or the like.

Note that although FIG. 12 illustrates the split-type air conditioner including the indoor unit and the outdoor unit, the secondary battery of one embodiment of the present invention can be used in an air conditioner in which the functions of an indoor unit and an outdoor unit are integrated in one housing.

In FIG. 12, an electric refrigerator-freezer 8300 is an example of an electronic device including a secondary battery 8304 of one embodiment of the present invention. Specifically, the electric refrigerator-freezer 8300 includes a housing 8301, a refrigerator door 8302, a freezer door 8303, the secondary battery 8304, and the like. The secondary battery 8304 is provided inside the housing 8301 in FIG. 12. The electric refrigerator-freezer 8300 can receive electric power from a commercial power supply, or can use electric power stored in the secondary battery 8304. Thus, the electric refrigerator-freezer 8300 can be utilized with the use of the secondary battery 8304 of one embodiment of the present invention as an uninterruptible power supply even when electric power cannot be supplied from a commercial power supply due to power failure or the like.

Note that among the electronic devices described above, a high-frequency heating apparatus such as a microwave oven and an electronic device such as an electric rice cooker require high power in a short time. Hence, the tripping of a breaker of a commercial power supply in use of an electronic device can be prevented by using the secondary battery of one embodiment of the present invention as an auxiliary power supply for supplying electric power which cannot be supplied enough by a commercial power supply.

In addition, in a time period when electronic devices are not used, particularly in a time period when the proportion of the amount of electric power that is actually used to the total amount of electric power that can be supplied from a commercial power supply source (such a proportion is referred to as a usage rate of electric power) is low, electric power can be stored in the secondary battery, whereby an increase in the usage rate of electric power can be inhibited in a time period other than the above time period. For example, in the case of the electric refrigerator-freezer 8300, electric power is stored in the secondary battery 8304 in night time when the temperature is low and the refrigerator door 8302 and the freezer door 8303 are not often opened or closed. In daytime when the temperature is high and the refrigerator door 8302 and the freezer door 8303 are frequently opened and closed, the secondary battery 8304 is used as an auxiliary power supply; thus, the usage rate of electric power in daytime can be reduced.

According to one embodiment of the present invention, the secondary battery can have excellent cycle performance and improved reliability. Furthermore, according to one embodiment of the present invention, a secondary battery with high capacity can be obtained; thus, the secondary battery itself can be made more compact and lightweight as a result of improved characteristics of the secondary battery. Thus, the secondary battery of one embodiment of the present invention is incorporated in the electronic device described in this embodiment, whereby a more lightweight electronic device with a longer lifetime can be obtained.

<Moving Object>

Next, examples of incorporating the secondary battery of one embodiment of the present invention in moving objects such as vehicles are described.

The incorporation of secondary batteries in moving objects achieves next-generation clean energy vehicles such as hybrid electric vehicles (HEVs), electric vehicles (EVs), and plug-in hybrid electric vehicles (PHEVs).

Figure 13A:
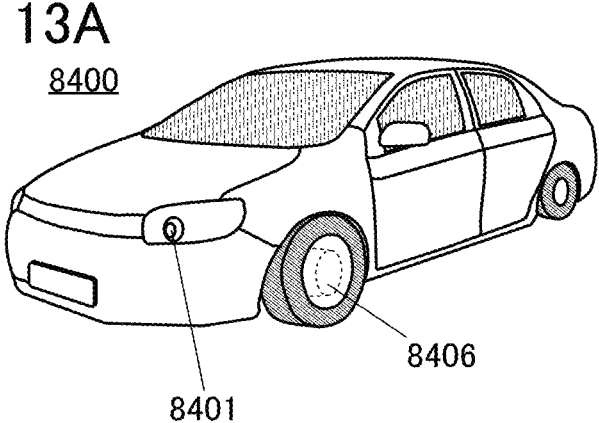
FIGS. 13A to 13C Diagrams illustrating examples of moving vehicles.

FIG. 13 illustrates examples of moving objects each using the secondary battery of one embodiment of the present invention. An automobile 8400 shown in FIG. 13(A) is an electric vehicle that runs on the power of an electric motor. Alternatively, the automobile 8400 is a hybrid electric vehicle capable of running on the power of either an electric motor or an engine as appropriate. The use of one embodiment of the present invention achieves a high-mileage moving object. The automobile 8400 includes the secondary battery. As the secondary battery, the modules of the secondary batteries shown in FIG. 9(C) and FIG. 9(D) may be arranged to be used in a floor portion in the automobile. The secondary battery is used not only for driving an electric motor 8406, but also for supplying electric power to a light-emitting device such as a headlight 8401 or a room light (not shown).

The secondary battery can also supply electric power to a display device included in the automobile 8400, such as a speedometer or a tachometer. Furthermore, the secondary battery can supply electric power to a semiconductor device included in the automobile 8400, such as a navigation system.

Figure 13B:
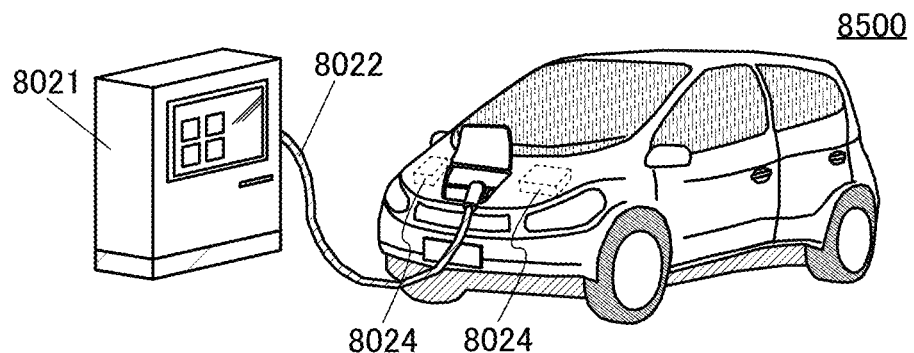

An automobile 8500 shown in FIG. 13(B) includes a secondary battery and can be charged when the secondary battery is supplied with electric power through external charging equipment by a plug-in system, a contactless power feeding system, or the like. FIG. 13(B) shows a state where a secondary battery 8024 included in the automobile 8500 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The charging apparatus 8021 may be a charging station provided in a commerce facility or a power source in a house. For example, with the use of a plug-in technique, the secondary battery 8024 incorporated in the automobile 8500 can be charged by being supplied with electric power from the outside. The charging can be performed by converting AC electric power into DC electric power through a converter such as an ACDC converter.

Although not shown, the moving device may incorporate a power receiving device so that it can be charged by being supplied with electric power from an above-ground power transmitting device in a contactless manner. In the case of the contactless power feeding system, by fitting a power transmitting device in a road or an exterior wall, charging can be performed not only when the moving object stops but also when moves. In addition, the contactless power feeding system may be utilized to perform transmission and reception of electric power between moving objects. Furthermore, a solar cell may be provided in the exterior of the mobbing object to charge the secondary battery when the moving object stops or moves. To supply electric power in such a contactless manner, an electromagnetic induction method or a magnetic resonance method can be used.

Figure 13C:
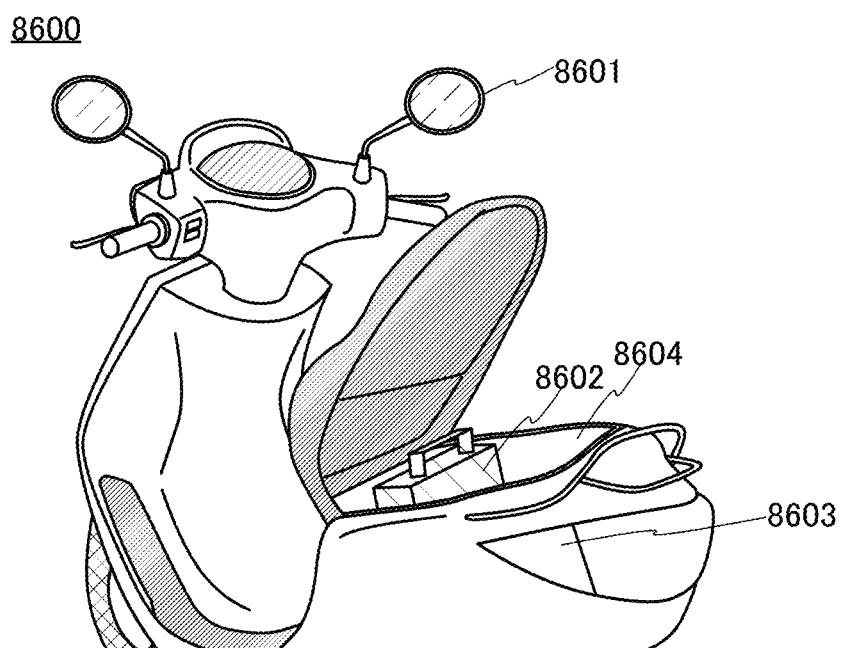
Figure 14A:
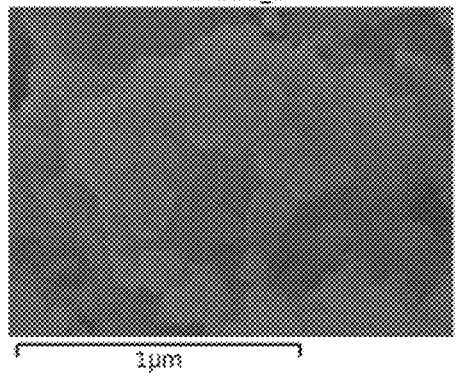
FIGS. 14A to 14E A SEM image and SEM-EDX analysis results of a negative electrode active material manufactured by a method described in Example.
Figure 14B:
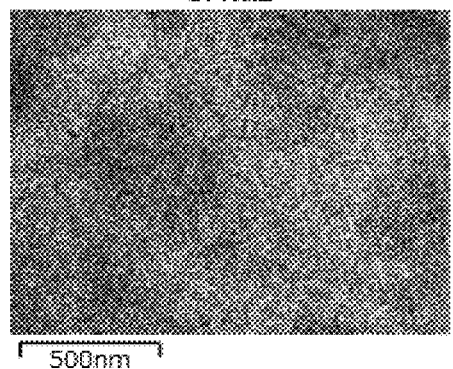
Figure 14C:
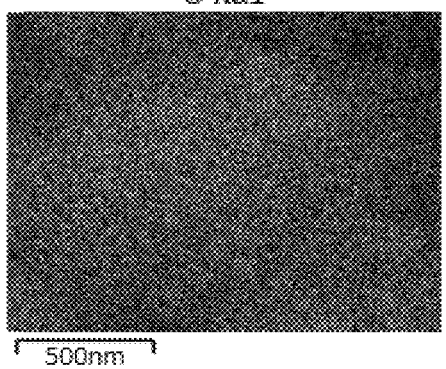
Figure 14D:
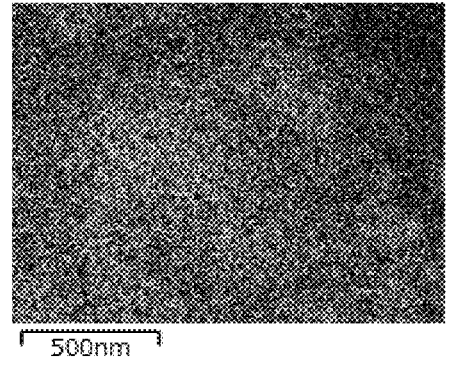
Figure 14E:
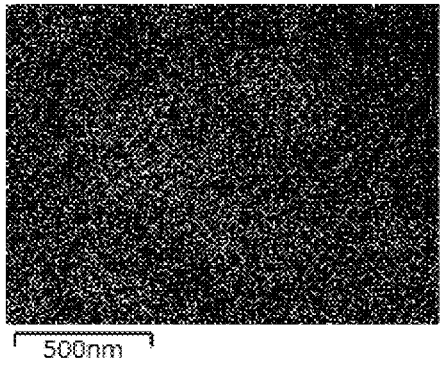

FIG. 13(C) shows an example of a motorcycle including the secondary battery of one embodiment of the present invention. A motor scooter 8600 shown in FIG. 13(C) includes a secondary battery 8602, side mirrors 8601, and direction indicators 8603. The secondary battery 8602 can supply electric power to the direction indicators 8603.

In the motor scooter 8600 shown in FIG. 13(C), the secondary battery 8602 can be stored in an under-seat storage 8604. The secondary battery 8602 can be stored in the under-seat storage 8604 even when the under-seat storage 8604 is small. The secondary battery 8602 is detachable; thus, the secondary battery 8602 may be carried indoors when charged, and may be stored before the motor scooter is driven.

According to one embodiment of the present invention, the secondary battery can have improved cycle performance and the capacity of the secondary battery can be increased. Thus, the secondary battery itself can be made more compact and lightweight. The compact and lightweight secondary battery contributes to a reduction in the weight of a moving object, and thus increases the mileage. Furthermore, the secondary battery incorporated in the moving object can be used as a power source for supplying electric power to products other than the moving object. In such a case, the use of a commercial power supply can be avoided at peak time of electric power demand, for example. Avoiding the use of a commercial power supply at peak time of electric power demand can contribute to energy saving and a reduction in carbon dioxide emissions. Moreover, the secondary battery with excellent cycle performance can be used over a long period; thus, the use amount of rare metals such as cobalt can be reduced.

Note that this embodiment can be combined with the other embodiments and/or the example in this specification as appropriate.

EXAMPLE

Described in this example are the results of manufacturing the negative electrode active material of one embodiment of the present invention and analyzing the negative electrode active material.

<Manufacturing of Samples>

A manufacturing process of the negative electrode active material that was analyzed is described. As the analyzed negative electrode active material, a sample (a first mixture) in which silicon is added to LTPO, Sample SP1, was manufactured. Sample SP2 was manufactured as a sample (a second mixture) in which silicon was added to LATP, and Sample SP3 was manufactured as a sample in which Sample SP2 was further coated with RGO.

<<Sample SP1>>

First, a manufacturing process of Sample SP1 is described. As described in Step S01 in Embodiment 1, Sample SP1 contains lithium carbonate ($Li_2CO_3$), titanium oxide ($TiO_2$), and ammonium hydrogenphosphate ($NH_4H_2PO_4$) as raw materials, and each raw material was weighed so that the manufactured sample would be $LiTi_2(PO_4)_3$.

Then, in Step S02, the starting raw materials were mixed with a ball mill. Mixing conditions were specifically as follows: dehydrated acetone was used in a wet method, and mixing and crushing were performed using a zirconia ball with a size of 3 mmϕ at a rotation number of 300 rpm for 2 hours.

Subsequently, the zirconia ball and the mixture were separated with a sieve with an aperture of 1 mm. At that time, dehydrated acetone was injected in order to separate also the mixture attached to an edge of the sieve, a mesh space, the zirconia ball, and the like.

Then, dehydrated acetone was evaporated with a hot plate at 60° C. in order to be removed from the mixture obtained by the separation.

Next, as shown in Step S03, the mixture from which dehydrated acetone was evaporated was put into an alumina crucible and heated with a muffle furnace under the conditions of a nitrogen atmosphere, 400° C., and 10 hours. Note that ammonium hydrogenphosphate, which is the starting material, is decomposed in this step.

Next, as shown in Step S04, the baked product obtained in Step S03 was crushed in a mortar, and the crushed baked product was crushed into finer products with a ball mill. Note that the crushing with the ball mill was performed using dehydrated acetone in a wet method with a zirconia ball at a rotation number of 300 rpm for 2 hours as in the milling conditions in Step S02.

Subsequently, as in Step S02, the zirconia ball and the crushed product were separated with a sieve with an aperture of 1 mm, and dehydrated acetone was evaporated with a hot plate at 60° C. in order to be removed from the separated crushed product.

Next, as shown in Step S05, the crushed product from which dehydrated acetone was evaporated was put into an alumina crucible, and main baking was performed with a muffle furnace under the conditions of a nitrogen atmosphere, 900° C., and 12 hours.

After the main baking, as shown in Step S06, the baked product was crushed in a mortar. Next, the crushed baked product was made to pass through a sieve with an aperture of 32 μm and crushed into finer products with a ball mill. Note that the crushing with the ball mill was performed using dehydrated acetone in a wet method with a zirconia ball at a rotation number of 300 rpm for 6 hours.

Subsequently, the zirconia ball and the crushed product were separated with a sieve with an aperture of 20 μm, and dehydrated acetone was evaporated with a hot plate at 60° C. in order to be removed from the separated crushed product.

In Step S11, 1 g of LTPO manufactured in Step S06 and 1 g of nanosilicon (fabricated by Sigma-Aldrich Corporation) were prepared and mixed with a ball mill. Mixing conditions were specifically as follows: dehydrated acetone was used in a wet method, and mixing and crushing were performed using a zirconia ball at a rotation number of 300 rpm for 2 hours.

Subsequently, as in Step S06, the zirconia ball and the crushed product were separated with a sieve with an aperture of 20 μm, and dehydrated acetone was evaporated with a hot plate at 60° C. in order to be removed from the separated mixture.

Next, as shown in Step S12, the mixture from which acetone was removed was subjected to tableting with a tableting machine. Specifically, the mixture was put into a pellet dice with a diameter of 15 mm and was subjected to a pressure of 14.7 MPa for 5 minutes, whereby a molded product was manufactured.

Next, as shown in Step S13, the molded product was put into an alumina crucible and heated with a muffle furnace under the conditions of a nitrogen atmosphere, 900° C., and 5 hours.

Lastly, the baked product manufactured above was crushed in a mortar, and further crushed into finer products with a ball mill. Note that the crushing with the ball mill was performed using dehydrated acetone in a wet method with a zirconia ball (3 mmφ) at a rotation number of 300 rpm for 2 hours. Then, the crushed product was made to pass through a sieve with an aperture of 1 mm, whereby the mixture of nanosilicon and LTPO (Sample SP1) was manufactured.

<<Sample SP2>>

Next, a manufacturing process of Sample SP2 is described. As described in the manufacturing of LATP in Embodiment 1, Sample SP2 contains lithium carbonate ($Li_2CO_3$), titanium oxide ($TiO_2$), ammonium hydrogenphosphate ($NH_4H_2PO_4$), and aluminum oxide ($Al_2O_3$) as raw materials, and each raw material was weighed so that the manufactured sample would be $LiTi_{1.7}Al_{0.3}(PO_4)_3$.

Note that for the subsequent manufacturing process, the manufacturing process of Sample SP1 was referred to. That is, Sample SP2 was manufactured in a process similar to that of Sample SP1.

<<Sample SP3>>

Next, a manufacturing process of Sample SP3 is described. As described above, Sample SP3 is a sample in which Sample SP2, which is the mixture of nanosilicon and LATP (the second mixture), is coated with RGO.

First, as described in Step S21 in Embodiment 1, 0.75 g of second mixture (Sample SP2) was prepared. In addition, 0.01526 g of GO fabricated by NiSiNa materials Co., Ltd. was prepared and subjected to spray drying using a spray dry apparatus. Note that GO has such a mass that 2 wt % of GO is contained in the manufactured Sample SP2.

Next, in Step S22, water was added to GO and then, GO was stirred with a mixer. The addition of water and stirring were repeated nine times. Specific conditions are shown in Table below. As shown in the conditions of Table below, the stirring was performed at 2000 rpm for 5 minutes from the first time to the ninth time.

Next, as shown in Step S26, the mixture manufactured in Step S25 was reduced with ethanol, ascorbic acid, and lithium hydroxide hydrate ($LiOH·H_2O$). Specifically, first, 0.0506 g of ascorbic acid and 0.0118 g of lithium hydroxide 6-hydrate were dissolved in 15 ml of ethanol, the mixture was added to that solution, and then, stirring was performed at 60° C. for 3 hours. Next, ascorbic acid and lithium hydroxide were washed away with ethanol, and further with acetone, whereby the mixture was collected. After the collection, the mixture was crushed in a mortar.

Subsequently, as shown in Step S27 and Step S28, the obtained mixture was dried with a glass tube oven in vacuum at 250° C. for 10 hours. This method allows thermal reduction of GO included in the mixture to be performed at the same time as the removal of water and/or an organic solvent.

As shown in Step S29, the mixture manufactured in Step S27 and Step S28 was crushed in a mortar and made to pass through a sieve with an aperture of 20 μm, whereby the mixture was collected. This mixture was analyzed as Sample SP3.

<SEM Observation Results of Negative Electrode Active Material>

FIG. 14 shows the observation results of Sample SP2 by SEM (Scanning Electron Microscope), and element analysis results by SEM-EDX (Energy Dipersive X-ray Spectroscopy). FIG. 14(A) is a SEM image of Sample SP2, and FIGS. 14(B) to 14(E) each show a mapping image of silicon (Si), oxygen (O), phosphorus (P), and titanium (Ti), respectively, obtained by SEM-EDX with the Kα1 line. FIG. 14(A) shows that silicon and LATP, which are primary particles each with a size greater than or equal to approximately 10 nm and less than or equal to approximately 100 nm, are aggregated to form secondary particles. FIGS. 14(B) to 14(E) show that silicon and LATP are dispersed substantially uniformly in Sample SP2.

<XRD Analysis of Negative Electrode Active Material>

Sample SP1 and Sample SP2, which are the negative electrode active materials manufactured above, were analyzed by powder XRD (X-ray Diffraction) with the CuKα1 line. Note that D8 ADVANCE fabricated by Bruker AXS GmbH was used as an XRD apparatus. The measurement was performed by an out-of-plane method under the conditions where 2θ changes in steps of 0.01 in the range of from 15° to 90°.

Figure 15:
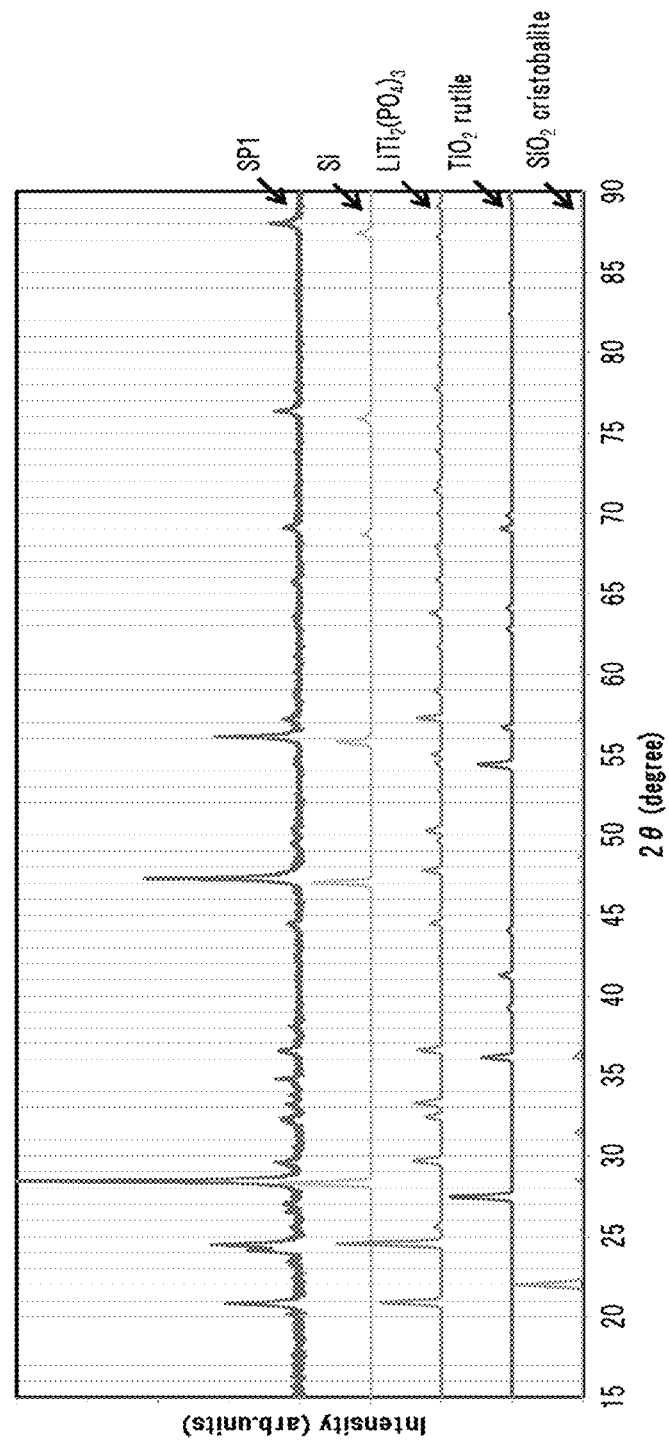
FIG. 15 A graph showing XRD patterns of a negative electrode active material manufactured by a method described in Example.
Figure 16:
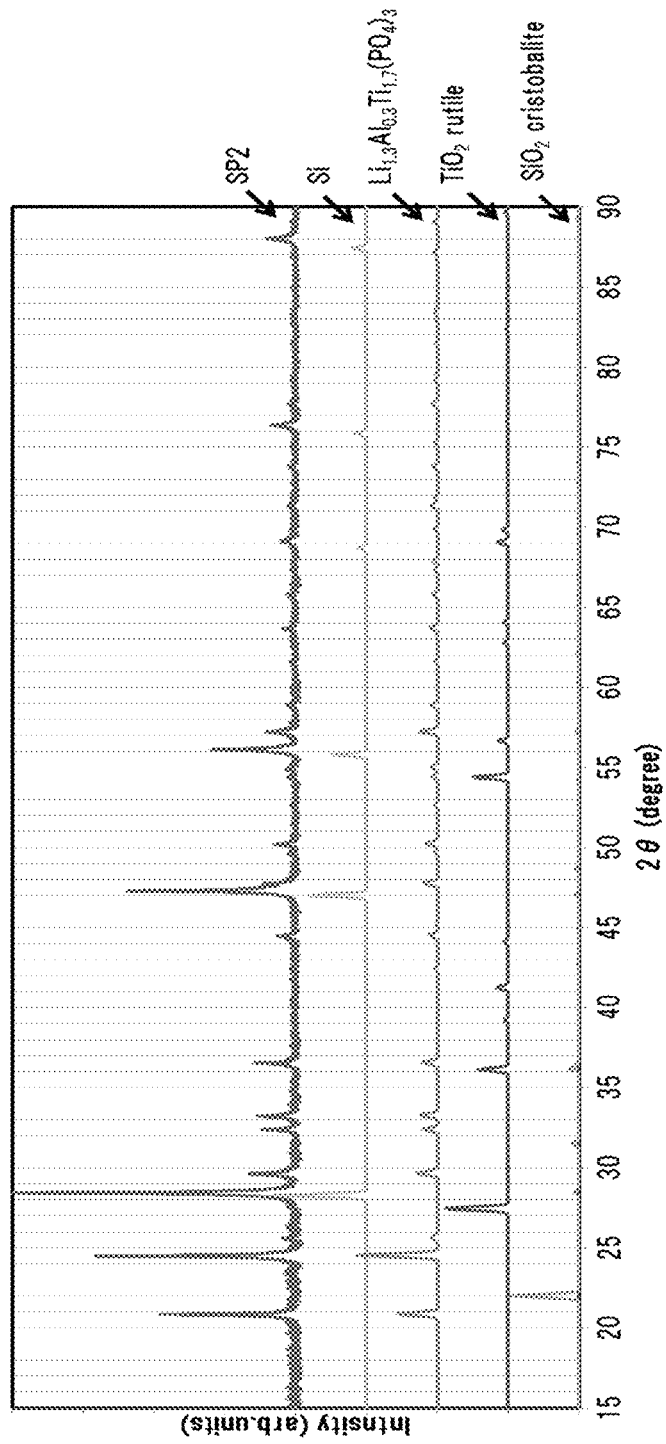
FIG. 16 A graph showing XRD patterns of a negative electrode active material manufactured by a method described in Example.

FIG. 15 and FIG. 16 show the measurement results of Sample SP1 and Sample SP2 by powder XRD. Note that in the measurement results of FIG. 15 and FIG. 16, the

TABLE 1

| Number of times | First | Second | Third | Fourth | Fifth | Sixth | Seventh | Eighth | Ninth |
|---|---|---|---|---|---|---|---|---|---|
| Amount of added water | 45 μl | 45 μl | 45 μl | 25 μl | 120 μl | 75 μl | 50 μl | 100 μl | 200 μl |
| Stirring conditions | | | | 2000 rpm, five minutes | | | | | |

Next, as shown in Step S23, stirred GO was added to the second mixture prepared in Step S21, and kneading was performed with a mixer. Note that the conditions were 2000 rpm and 5 minutes.

As shown in Step S24, the mixture kneaded in Step S23 was put into a circulation drying furnace and dried at 50° C. for 12 hours, so that moisture was removed from the mixture.

Subsequently, as shown in Step S25, the mixture manufactured in Step S24 was crushed in a mortar and made to pass through a sieve with an aperture of 300 μm.

horizontal axis represents 2θ (degree) and the vertical axis represents Intensity (arb. units). For comparison, FIG. 15 also shows the XRD patterns of Si, $LiTi_2(PO_4)_3$, $TiO_2$ (rutile), and $SiO_2$ (cristobalite). FIG. 16 shows the XRD patterns of $Li_{1.3}Al_{0.3}Ti_{1.7}(PO_4)_3$ instead of $LiTi_2(PO_4)_3$, in addition to Si, $TiO_2$ (rutile), and $SiO_2$ (cristobalite). Note that the XRD patterns of Si, $LiTi_2(PO_4)_3$, $Li_{1.3}Al_{0.3}Ti_{1.7}(PO_4)_3$, $TiO_2$ (rutile), and $SiO_2$ (cristobalite) were obtained from ICSD (Inorganic Crystal Structure Database). Note that the XRD patterns were set in the following manner: the step width of 2θ was 0.01°, the wavelength λ1 was $1.540562 \times 10^{-10}$ m, and the wavelength λ2 was not used.

In the XRD pattern of Sample SP1 shown in FIG. 15, diffraction peaks appear at 2θ=28.2±0.1° (greater than or equal to 28.1° and less than or equal to 28.3°), 2θ=47.3±0.1° (greater than or equal to 46.2° and less than or equal to 47.4°), and 2θ=56.0±0.1° (greater than or equal to 55.9° and less than or equal to 56.1°). The positions of these diffraction peaks are found to be substantially the same as the positions of diffraction peaks appearing in the XRD pattern of Si. Also in the XRD pattern of Sample SP2 shown in FIG. 16, diffraction peaks appear at 2θ=28.2±0.1° (greater than or equal to 28.1° and less than or equal to 28.3°), 2θ=47.3±0.1° (greater than or equal to 47.2° and less than or equal to 47.4°), and 2θ=56.0±0.1° (greater than or equal to 55.9° and less than or equal to 56.1°), indicating that the positions of these diffraction peaks are substantially the same as the positions of diffraction peaks appearing in the XRD pattern of Si.

In the XRD pattern of Sample SP1 shown in FIG. 15, diffraction peaks appear at 2θ=20.9±0.1° (greater than or equal to 20.8° and less than or equal to 21.0°), and 2θ=24.5±0.1° (greater than or equal to 24.4° and less than or equal to 24.6°); the positions of these diffraction peaks are substantially the same as the positions of diffraction peaks appearing in the XRD pattern of $LiTi_2(PO_4)_3$. However, the XRD pattern of Sample SP1 has diffraction peaks at 2θ=24.1±0.1° (greater than or equal to 24.0° and less than or equal to 24.2°), and the like, which cannot be identified with those in the XRD patterns of Si and $LiTi_2(PO_4)_3$. In addition, no diffraction peak appears in the XRD pattern of Sample SP1 in the positions of 2θ=32.4±0.1° (greater than or equal to 32.3° and less than or equal to 32.5°), 2θ=33.2±0.1° (greater than or equal to 32.1° and less than or equal to 33.3°), and the like where diffraction peaks appear in the XRD pattern of $LiTi_2(PO_4)_3$. This suggests that Sample SP1 has a low proportion of LTPO and a high proportion of impurities.

On the other hand, in the XRD pattern of Sample SP2 shown in FIG. 16, diffraction peaks appear at 2θ=32.4±0.1° (greater than or equal to 32.3° and less than or equal to 32.5°), 2θ=33.2±0.1° (greater than or equal to 33.1° and less than or equal to 33.3°), and the like in addition to 2θ=20.9±0.1° (greater than or equal to 20.8° and less than or equal to 21.0°), and 2θ=24.5±0.1° (greater than or equal to 24.4° and less than or equal to 24.6°). That is, the XRD pattern of Sample SP2 has few diffraction peaks that cannot be identified with those in the XRD patterns of Si and $Li_{1.3}Al_{0.3}Ti_{1.7}(PO_4)_3$, suggesting that Sample SP2 has a high proportion of LATP and a low proportion of impurities.

According to FIG. 15 and FIG. 16, the XRD patterns of Sample SP1 and Sample SP2 each have few diffraction peaks that can be identified with those in the XRD patterns of $TiO_2$ (rutile), and $SiO_2$ (cristobalite), indicating that decomposition into $TiO_2$ and $SiO_2$ does not occur in each of Sample SP1 and Sample SP2.

The XRD patterns obtained above were subjected to Rietveld analysis with TOPAS Ver. 3 (crystal structure analysis software fabricated by Bruker Corporation). As the result of calculation, the crystallite size of nanosilicon was 61 nm and the crystal size of LTPO was 30 nm in Sample SP1 of FIG. 15. In Sample SP2 of FIG. 16, the crystallite size of nanosilicon and the crystal size of LATP were calculated to be 60 nm and 68 nm, respectively; this result indicates that nanosilicon and LATP have substantially the same crystal size.

<Manufacturing and Measuring of Test Cell>

CR2032 coin-type (diameter: 20 mm, height: 3.2 mm) test cells (Li half cells) were manufactured using the negative electrode active materials (Sample SP1 to Sample SP3) manufactured above.

To obtain a negative electrode, a slurry in which any one of Sample SP1 to Sample SP3 (hereinafter referred to as SP), which is the negative electrode active material, acetylene black (AB), and polyimide (PI, accurately a precursor of polyimide) were mixed at a weight ratio of SP:AB:PI=80:5:15 was applied to nickel-plating copper foil as a current collector.

Specifically, first, any one of Sample SP1 to Sample SP3 and acetylene black were mixed with a mixer using NMP (N-methyl-2-pyrrolidone) as a solvent, and then, a precursor of polyimide and NMP were further added and mixed with a mixer, whereby a slurry was manufactured. The slurry was applied to the current collector by a blade method. At this time, the blade was operated at a speed of 10 mm/sec. Lastly, the slurry applied to the current collector was heated in a nitrogen atmosphere at 400° C. for 5 hours in order that the precursor of polyimide would be imidized, whereby the negative electrode was manufactured.

Note that in order to manufacture negative electrodes with different carried amounts, the blade method in the above manufacturing example was performed in two conditions: the gap between the blade and the current corrector was 50 μm or 100 μm. As a result, the carried amounts of the negative electrodes using Sample SP1 were 0.67 mg/cm$^2$ and 1.31 mg/cm$^2$ in the respective conditions. The carried amounts of the negative electrodes using Sample SP2 were 0.77 mg/cm$^2$ and 1.37 mg/cm$^2$ in the respective conditions. Furthermore, the carried amounts of the negative electrodes using Sample SP3 were 0.63 mg/cm$^2$ and 1.18 mg/cm$^2$ in the respective conditions.

A lithium metal was used for a counter electrode. As a separator, polypropylene was used.

As an electrolyte contained in an electrolyte solution, 1 mol/L of lithium hexafluorophosphate ($LiPF_6$) was used, and as the electrolyte solution, ethylene carbonate (EC) and diethyl carbonate (DEC) were mixed at EC:DEC=3:7 (volume ratio).

In this example, a test cell using Sample SP1 that includes a negative electrode with a carried amount of 0.67 mg/cm$^2$ is referred to as a cell CS1[1], and a test cell using Sample SP1 that includes a negative electrode with a carried amount of 1.31 mg/cm$^2$ is referred to as a cell CS1[2]. A test cell using Sample SP2 that includes a negative electrode with a carried amount of 0.77 mg/cm$^2$ is referred to as a cell CS2[1], and a test cell using Sample SP2 that includes a negative electrode with a carried amount of 1.37 mg/cm$^2$ is referred to as a cell CS2[2]. A test cell using Sample SP3 that includes a negative electrode with a carried amount of 0.63 mg/cm$^2$ is referred to as a cell CS3[1], and a test cell using Sample SP3 that includes a negative electrode with a carried amount of 1.18 mg/cm$^2$ is referred to as a cell CS3[2]. Described below are the results of measuring the cycle performance of the cell CS1[1], the cell CS1[2], the cell CS2[1], the cell CS2[2], the cell CS3[1], and the cell CS3[2].

Figure 17:
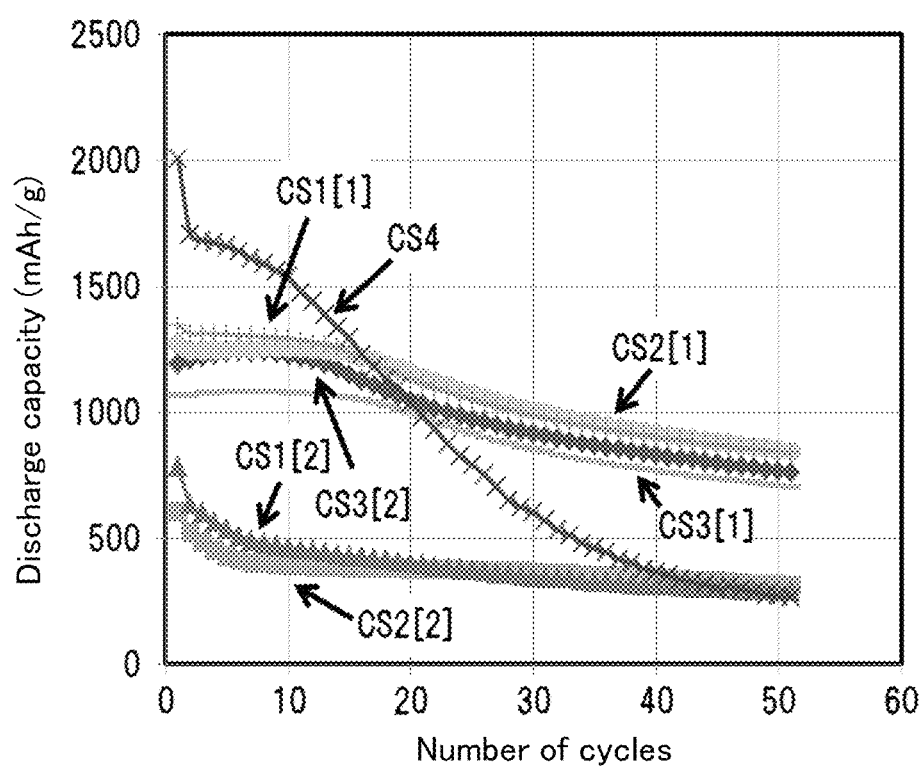
FIG. 17 A graph showing the cycle performances of test cells described in Example.

FIG. 17 is a graph showing the results of the cycle performance of a cell CS4 as well as the cell CS1[1], the cell CS1[2], the cell CS2[1], the cell CS2[2], the cell CS3[1], and the cell CS3[2]; the horizontal axis represents the number of cycles and the vertical axis represents the discharge capacity (mAh/g). The cell CS4 is a test cell in which a negative electrode of nanosilicon with a carried amount of 0.83 mg/cm$^2$ is formed over a current collector.

The measurement conditions of the test cells are described. As the charging and discharging method, constant current-constant voltage charging and constant current discharging were performed at a rate of 0.1 C only in the first charging and discharging, and constant current-constant voltage charging and constant current discharging were performed at a rate of 0.2 C in the second and subsequent charging and discharging. Note that the upper limit voltage and the lower limit voltage in charging and discharging were 1.5 V and 0.01 V, respectively, and the measurement temperature was 25° C. The rate of the active material containing silicon was calculated in each cell with 4190 mAh/g per carried amount as a reference.

The results of the cycle performance in FIG. 17 show that the discharge capacity in the cell CS1[2] with a high carried amount is entirely lower than that in the cell CS1[1] with a low carried amount. Similarly, the discharge capacity in the cell CS2[2] with a high carried amount is entirely lower than that in the cell CS2[1] with a low carried amount. This is probably because in the negative electrode active material in which silicon is added to LTPO and the negative electrode active material in which silicon is added to LATP, the electrode layer becomes thicker and the electric resistance in the thickness direction becomes higher as the carried amount increases.

The cell CS4 exhibits higher discharge capacity than the other test cells until the number of cycles is approximately 10; however, the discharge capacity is found to rapidly decrease when the number of cycles exceeds 10. This is probably because nanosilicon included in the negative electrode active material has peeled off from the current collector due to repeated expansion and contraction.

An effect of decomposition of the electrolyte solution is probably another reason for the rapid decrease in discharge capacity. In the case where nanosilicon is used for the negative electrode, a large area of nanosilicon is in contact with the electrolyte solution; thus, the electrolyte solution in contact with nanosilicon is sometimes decomposed by chemical reaction. As a result, a reaction product of a decomposed solution and nanosilicon is formed on the surface of nanosilicon. As the reaction product occupies a larger area, the contact area of nanosilicon and the electrolyte solution becomes smaller, leading to a reduction in the number of lithium that can be inserted and extracted into and from nanosilicon. Consequently, the discharge capacity of the cell CS4 including nanosilicon in the negative electrode probably decreases due to repeated cycles.

The results of the cell CS3 [1] and the cell CS3[2] show that the discharge capacity is not reduced to the level of the cell CS1[2] and the cell CS2[2] even when the carried amount increases. This is probably due to an increase in the conduction path of ions or electrons in the negative electrode active material which is obtained by adding silicon to LATP and to which RGO is further added.

Figure 18A:
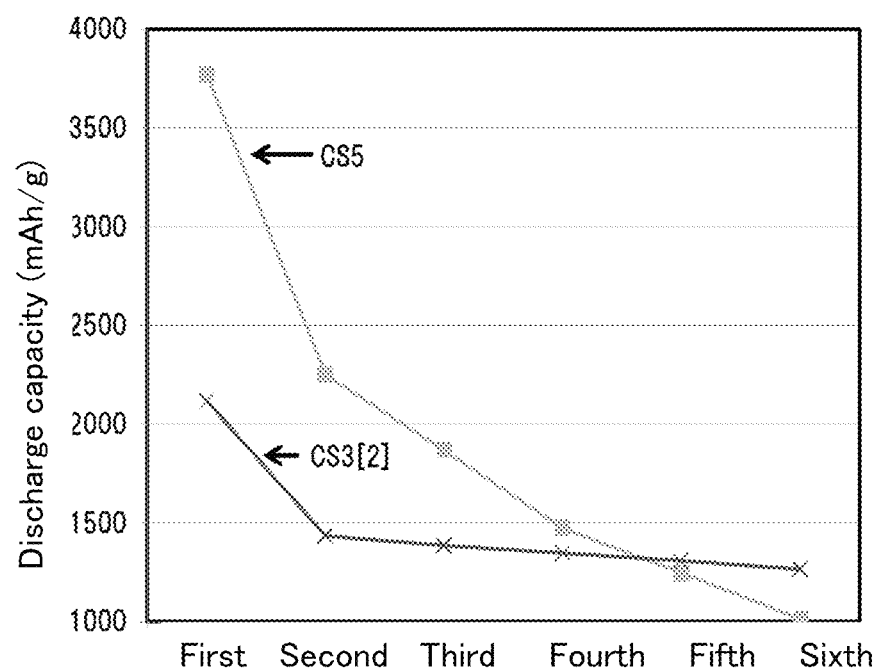
FIGS. 18A and 18B Graphs showing the rate performances of test cells described in Example.

The rate performance is described next. FIG. 18(A) is a graph showing the discharge capacity with respect to the discharge rate in each cycle of the cell CS3[2] and a cell CS5, and FIG. 18(B) is a graph showing the discharge capacity proportion with respect to the discharge rate in each cycle of the cell CS3[2] and the cell CS5.

The cell CS5 is a test cell in which a negative electrode of nanosilicon with a carried amount of 0.73 mg/cm² is formed over a current collector.

Note that FIG. 18 shows the measurement results of the rate performances of the cell CS3 [2] and the cell CS5 and the discharge capacity (mAh/g) in each of the first to sixth cycles. Note that the rate of each of the cell CS3[2] and the cell CS5 was calculated with 1500 mAh/g per carried amount. Specifically, the charge rate in each cycle was 0.1 C and the discharge rates in the first to sixth cycles were 0.1 C, 0.2 C, 0.5 C, 1 C, 2 C, and 0.1 C, respectively. That is, the discharge rate increases from the first cycle to the fifth cycle, and the discharge rate in the sixth cycle is equal to that in the first cycle.

Figure 18B:
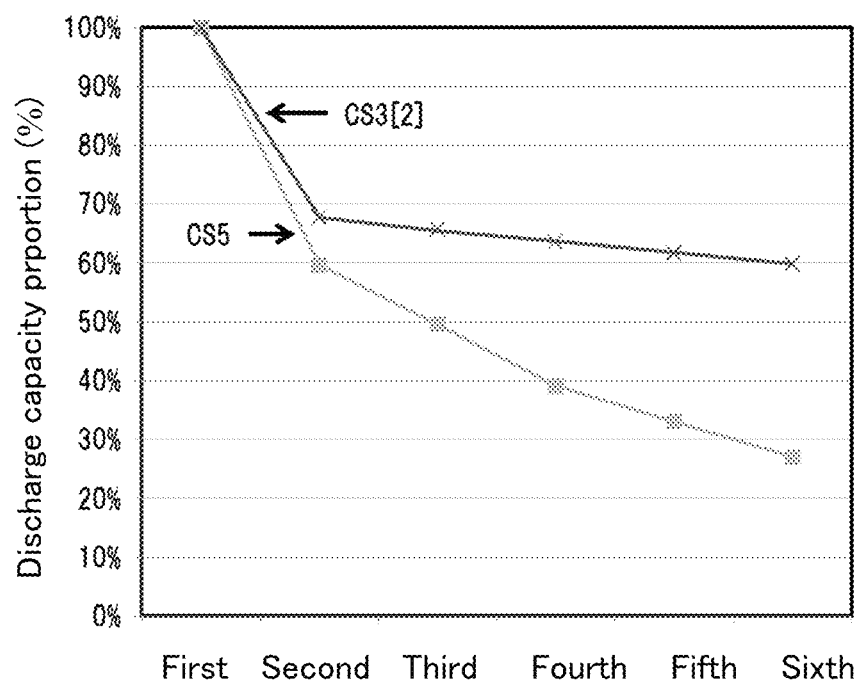

As shown in FIGS. 18(A) and 18(B), the discharge capacities of the cell CS5 and the cell CS3[2] in the first discharging were 3772.35 mAh/g and 2118.26 mAh/g, respectively.

The discharge capacity is found to significantly decrease in the cell CS5 as the discharge rate increases. In the sixth cycle having the same discharge rate as that in the first cycle, the discharge capacity proportion is reduced from that in the first cycle by 70% or more (2700 mAh/g or more).

In contrast, in the cell CS3[2], although the discharge capacity decreases as the discharge rate increases, the amount of decrease in discharge capacity is found to be smaller than that in the cell CS5. In the cell CS3[2], the discharge capacity is reduced by approximately 30% (approximately 680 mAh/g) from the first to the second discharging, whereas a change in the discharge capacity from the second to the sixth discharging is less than or equal to approximately 10%.

From the above results, the cell CS3[2], i.e., a secondary battery including the mixture of LATP, nanosilicon, and RGO as the negative electrode active material, can have such characteristics that the discharge capacity hardly deteriorates with the number of cycles and the discharge capacity proportion hardly decreases even with a high discharge rate.

Note that this example can be combined with the other embodiments in this specification as appropriate.

REFERENCE NUMERALS

R: internal resistance, C: secondary battery capacitance, SW1: switch, SW2: switch, SW3: switch, 100: negative electrode, 101: negative electrode current collector, 102: negative electrode active material layer, 103: particle, 104: solid electrolyte, 105: material, 300: secondary battery, 301: positive electrode can, 302: negative electrode can, 303: gasket, 304: positive electrode, 305: positive electrode current collector, 306: positive electrode active material layer, 307: negative electrode, 308: negative electrode current collector, 309: negative electrode active material layer, 310: separator, 600: secondary battery, 601: positive electrode cap, 602: battery can, 603: positive electrode terminal, 604: positive electrode, 605: separator, 606: negative electrode, 607: negative electrode terminal, 608: insulating plate, 609: insulating plate, 610: gasket, 611: PTC element, 612: safety valve mechanism, 613: conductive plate, 614: conductive plate, 615: module, 616: wiring, 617: temperature control device, 700: secondary battery, 710: positive electrode, 711: positive electrode active material, 713: positive electrode current collector, 714: positive electrode active material layer, 720: solid electrolyte layer, 721: solid electrolyte, 730: negative electrode, 731: negative electrode active material, 733: negative electrode current collector, 734: negative electrode active material layer, 8000: display device, 8001: housing, 8002: display portion, 8003: speaker portion, 8004: secondary battery, 8021: charging apparatus, 8022: cable, 8024: secondary battery, 8100: lighting device, 8101: housing, 8102: light source, 8103: secondary battery, 8104: ceiling, 8105: wall, 8106: floor, 8107: window, 8200: indoor unit, 8201: housing, 8202: air outlet, 8203: secondary battery, 8204: outdoor unit, 8300: electric refrigerator-freezer, 8301: housing, 8302: refrigerator door, 8303: freezer door, 8304: secondary battery, 8400: automobile, 8401: headlight, 8500: automobile, 8600: motor scooter, 8601: side mirror, 8602: secondary battery, 8603: direction indicator, 8604: under-seat storage, 9600: tablet terminal, 9625: switch, 9626: switch, 9627: switch, 9628: operation switch, 9629: fastener, 9630: housing, 9630*a*: housing, 9630*b*: housing, 9631: display portion, 9633: solar cell, 9634: charge and discharge control circuit, 9635: power storage unit, 9636: DCDC converter, 9637: converter, 9638: operation key, 9640: movable portion

The invention claimed is:
1. A negative electrode active material comprising:
  a secondary particle comprising:
    an active material being silicon; and
    a solid electrolyte; and
  a graphene compound coating the secondary particle,
    wherein the solid electrolyte contains lithium, titanium, phosphorus and oxygen.
2. The negative electrode active material according to claim 1, wherein the solid electrolyte contains aluminum.
3. The negative electrode active material according to claim 1, wherein the active material has a primary-particle size greater than or equal to 10 nm and less than or equal to 100 nm.
4. The negative electrode active material according to claim 1, wherein the graphene compound contains graphene oxide.
5. The negative electrode active material according to claim 1, wherein the graphene compound contains reduced graphene oxide.
6. A secondary battery comprising the negative electrode active material according to claim 1.
7. An electronic device comprising the secondary battery according to claim 6.

* * * * *